United States Patent
Terashima

(10) Patent No.: US 7,798,488 B1
(45) Date of Patent: Sep. 21, 2010

(54) PAPER SHEET CONVEYANCE METHOD AND PAPER SHEET CONVEYANCE DEVICE WITH COMMON BLOWER DUCT

(75) Inventor: Toshikatsu Terashima, Nagano (JP)

(73) Assignee: WINTEC Co., Ltd., Nagano (JP)

( * ) Notice: Subject to any disclaimer, the term of this patent is extended or adjusted under 35 U.S.C. 154(b) by 17 days.

(21) Appl. No.: 11/919,586

(22) PCT Filed: Aug. 6, 2007

(86) PCT No.: PCT/JP2007/065342

§ 371 (c)(1),
(2), (4) Date: Oct. 30, 2007

(87) PCT Pub. No.: WO2008/023562

PCT Pub. Date: Feb. 28, 2008

(30) Foreign Application Priority Data

Aug. 24, 2006  (JP) .............................. 2006-228283

(51) Int. Cl.
*B65H 29/70*  (2006.01)
(52) U.S. Cl. ........................ 271/188; 271/195; 271/209; 406/94; 406/120
(58) Field of Classification Search ................. 271/195, 271/188, 209; 406/29–33, 93–95, 120, 151–153
See application file for complete search history.

(56) References Cited

FOREIGN PATENT DOCUMENTS

| JP | 59-118652 U | | 3/1986 |
|---|---|---|---|
| JP | 2-1092 A | | 1/1990 |
| JP | 02001092 A | * | 1/1990 |
| JP | 8-91615 A | | 4/1996 |
| JP | 2003-44929 A | | 2/2003 |
| JP | 2006-218275 A | | 8/2006 |

* cited by examiner

*Primary Examiner*—Gene Crawford
*Assistant Examiner*—Gerald W McClain
(74) *Attorney, Agent, or Firm*—Birch, Stewart, Kolasch & Birch, LLP

(57) ABSTRACT

An equipment for conveying sheet-shaped members, including a plurality of blower ducts being arranged in parallel; a common duct connected to outlets of the blower ducts; an air stream unit for generating air streams in the blower ducts; a plurality of sheet feeding units respectively connected to the blower ducts, the sheet feeding units feeding sheet-shaped members into the blower ducts; a plurality of open/close valves respectively provided to the blower ducts, the open/close valves opening and closing the blower ducts; a drive section for respectively driving the open/close valves; a collecting unit provided to a terminal end of the common duct, the collecting unit collecting the sheet-shaped members conveyed; and a control section for controlling the drive section.

16 Claims, 15 Drawing Sheets

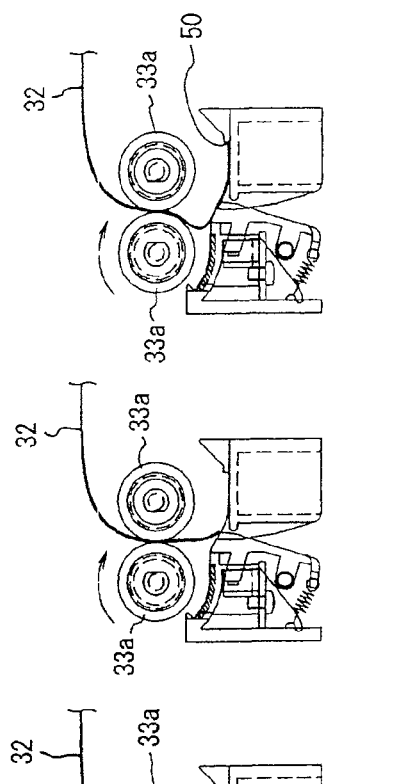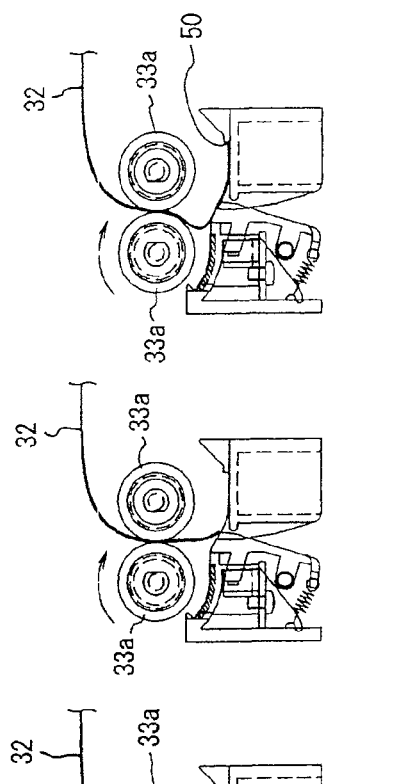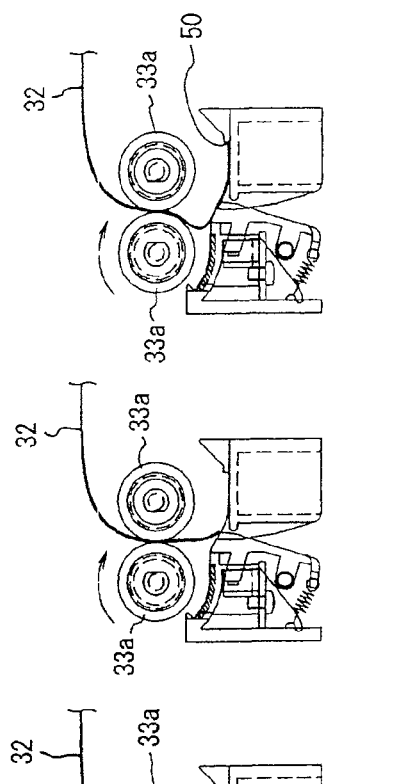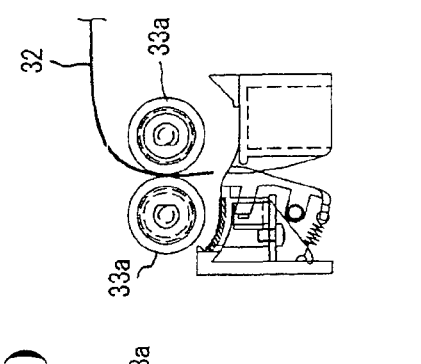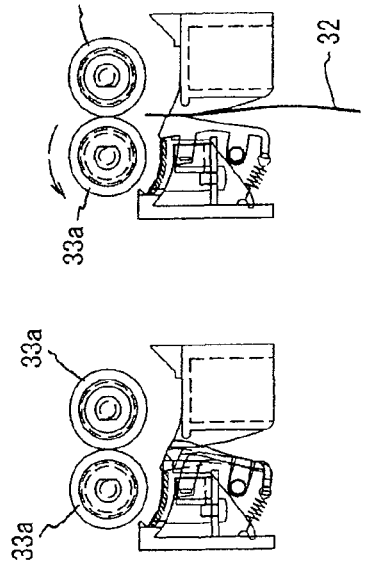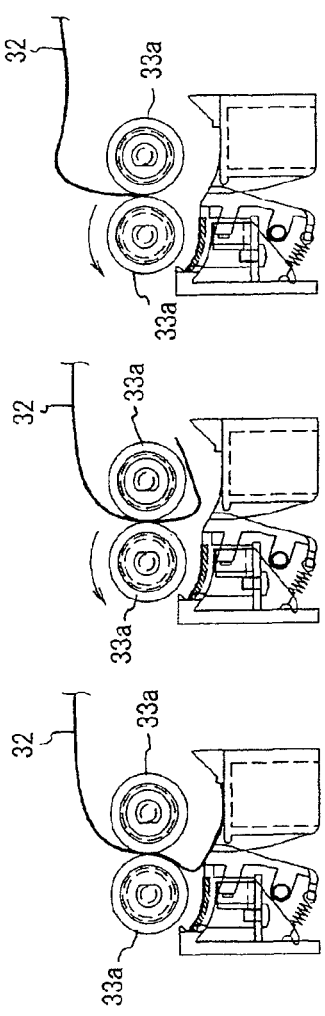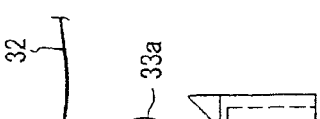

PAPER SHEET CONVEYANCE METHOD AND PAPER SHEET CONVEYANCE DEVICE WITH COMMON BLOWER DUCT

CROSS-REFERENCE TO RELATED APPLICATION

The present application is a National Stage application of International Application No. PCT/JP 2007/065342 filed on Aug. 6, 2007, and claims priority under 35 U.S.C. §119 to Japanese Patent Application No. 2006-228283 filed Aug. 24, 2006, the entire contents of which are hereby incorporated by reference.

FIELD OF TECHNOLOGY

The present invention relates to a method of conveying a sheet-shaped member by using an air stream and an equipment for conveying the sheet-shaped member.

BACKGROUND TECHNOLOGY

Banknote conveying equipments, each of which automatically conveys banknotes to a cash box set in a separate room or a separate building or to a storing room, have been used so as not to store banknotes in cash registers set in a supermarket, a convenience store, a game hall, etc. (see Patent Documents 1 and 2).

In the conventional equipments, banknotes are conveyed by a belt mechanism or rollers.

Patent Document 1: Japanese Patent Gazette No. 2003-44929

Patent Document 2: Japanese Patent Gazette No. 8-91615

DISCLOSURE OF THE INVENTION

For example, in an extensive game hall, the conventional equipment must be large in size and a running cost for driving the belt mechanism or rollers must be very high. Since banknotes are conveyed by mechanical means, banknotes will easily get jammed.

The present invention has been performed so as to solve the above described problem, and an object of the present invention is to provide a method and an equipment for conveying a sheet-shaped member, in each of which the sheet-shaped members can be well conveyed by using an air stream. The method of the present invention is performed in an equipment including: a plurality of blower ducts being arranged parallel; a common duct being connected to outlets of the blower ducts; an air stream unit for generating air streams in the blower ducts; a plurality of sheet feeding units being respectively connected to the blower ducts, the sheet feeding units feeding sheet-shaped members into the blower ducts; a plurality of open/close valves being respectively provided to the blower ducts, the open/close valves opening and closing the blower ducts; a drive section for respectively driving the open/close valves; a control section for controlling the drive section; and a collecting unit being provided to a terminal end of the common duct, the collecting unit collecting the sheet-shaped members conveyed, and the control section opens the open/close valve of the blower duct, which is connected to one of the sheet feeding units into which the sheet-shaped member is inserted, and closes the open/close valves of other blower ducts so as to preferentially maintain a flow volume of the air stream in the blower duct whose open/close valve is opened and limit flow volumes of the air streams in other blower ducts when the insertion of the sheet-shaped members is detected.

In the method, a flow passage area of the common duct is substantially equal to that of the blower duct.

In the method, the air stream unit is a suction blower for sucking the air in the common duct.

In the method, the control section opens the open/close valve of one of the blower ducts and closes the open/close valves of other blower ducts so as to feed the sheet-shaped member into the blower duct, whose open/close valve has been opened, when inserting the sheet-shaped members into a plurality of the sheet feeding units is detected; and the control section closes the opened open/close valve and opens the open/close valves of other blower ducts, into which sheet-shaped members have been inserted, in order after the collecting unit collects the sheet-shaped member.

In the method, the control section opens the open/close valve of one of the blower ducts and closes the open/close valves of other blower ducts so as to feed the sheet-shaped member into the blower duct, whose open/close valve has been opened, in order of detecting the insertion of the sheet-shaped members when inserting the sheet-shaped members into a plurality of the sheet feeding units is detected; and the control section closes the opened open/close valve and opens the open/close valves of other blower ducts, into which sheet-shaped members have been inserted, in order of detecting the insertion of the sheet-shaped members after the collecting unit collects the sheet-shaped member.

The equipment of the present invention comprises: a plurality of blower ducts being arranged parallel; a common duct being connected to outlets of the blower ducts; an air stream unit for generating air streams in the blower ducts; a plurality of sheet feeding units being respectively connected to the blower ducts, the sheet feeding units feeding sheet-shaped members into the blower ducts; a plurality of open/close valves being respectively provided to the blower ducts, the open/close valves opening and closing the blower ducts; a drive section for respectively driving the open/close valves; a collecting unit being provided to a terminal end of the common duct, the collecting unit collecting the sheet-shaped members conveyed; and a control section for controlling the drive section, and the control section opens the open/close valve of the blower duct, which is connected to one of the sheet feeding units into which the sheet-shaped member is inserted, and closes the open/close valves of other blower ducts so as to preferentially maintain a flow volume of the air stream in the blower duct whose open/close valve is opened and limit flow volumes of the air streams in other blower ducts when the insertion of the sheet-shaped members is detected.

In the equipment, a flow passage area of the common duct is substantially equal to that of the blower duct.

In the equipment, the air stream unit is a suction blower for sucking the air in the common duct.

In the equipment, the control section opens the open/close valve of one of the blower ducts and closes the open/close valves of other blower ducts so as to feed the sheet-shaped member into the blower duct, whose open/close valve has been opened, when inserting the sheet-shaped members into a plurality of the sheet feeding units is detected; and the control section closes the opened open/close valve and opens the open/close valves of other blower ducts, into which sheet-shaped members have been inserted, in order after the collecting unit collects the sheet-shaped member.

In the equipment, the control section opens the open/close valve of one of the blower ducts and closes the open/close valves of other blower ducts so as to feed the sheet-shaped member into the blower duct, whose open/close valve has been opened, in order of detecting the insertion of the sheet-shaped members when inserting the sheet-shaped members into a plurality of the sheet feeding units is detected; and the control section closes the opened open/close valve and opens the open/close valves of other blower ducts, into which sheet-shaped members have been inserted, in order of detecting the insertion of the sheet-shaped members after the collecting unit collects the sheet-shaped member.

In the equipment, the equipment further includes a bending unit for bending the sheet-shaped member so as to form a temporary deformity in the sheet-shaped member, and the sheet-shaped member is conveyed by applying a wind pressure to the deformity.

In the equipment, the bending unit forms the temporary deformity in a flat part of the sheet-shaped member, and the temporary deformity is formed into an L- or a J-shape in gothic script or script or curled like a tubular shape.

In the equipment, a plurality of ribs, which are inwardly projected with a prescribed height and extended in the air-streaming direction, are formed in each wall face of each of the blower ducts, which face surfaces of the sheet-shaped member, and a distance between front ends of the opposite ribs is designed to allow the deformity of the sheet-shaped member to pass through a space between the ribs.

In the equipment, a sectional shape of a space defined by lines connecting the front ends of the ribs is a rectangular shape.

In the equipment, each of the blower ducts has a turning section, which turns and conveys the sheet-shaped member and is connected to the common duct by a joint duct, which has ribs connected to ribs of the blower duct and the common duct, and a height of the ribs formed in an inner wall face of the turning section, which faces the one surface of the turned sheet-shaped member, is gradually reduced from a specified position, which is located on the upstream side of the turning section and separated a prescribed distance therefrom, to the turning section, and the height of the ribs is gradually increased from the turning section to a specified position, which is located on the downstream side of the turning section and separated a prescribed distance therefrom.

In the equipment, at least one of the blower duct and the common duct has a turning section, which turns and conveys the sheet-shaped member, and a turning duct, which has ribs connected to ribs of the blower duct and the common duct, is connected to the turning section, and a height of the ribs formed in an inner wall face of the turning duct, which faces the one surface of the turned sheet-shaped member, is gradually reduced from a specified position, which is located on the upstream side of the turning section and separated a prescribed distance therefrom, to the turning section, and the height of the ribs is gradually increased from the turning section to a specified position, which is located on the downstream side of the turning section and separated a prescribed distance therefrom.

In the equipment, a twisted duct section, which is twisted a prescribed angle with respect to an axial line of the blower duct, is connected to at least one of the blower duct and the common duct, and the twisted tube section has ribs connected to the ribs of the blower duct and the common duct.

In the equipment, a collecting unit, which collects the sheet-shaped members conveyed through the blower ducts, is provided to an end part of the common duct.

In the equipment, the collecting unit has a restoring roller, which bends the deformity of the sheet-shaped member in the opposite direction so as to remove the deformity.

In the equipment, each of the sheet feeding units has a banknote identification unit, which is located on the front side of the bending unit, and the banknote identification unit checks if the sheet-shaped member is a banknote or not, then the sheet-shaped member is fed to the blower duct via the bending unit.

The equipment may be installed in a store, such as a supermarket and a convenience store, a game hall or an ATM so as to collect sale proceeds.

In the equipment, sensors for detecting banknotes are provided near connection parts, each of which connects the blower duct to the common duct; when a sheet-shaped member is put in the sheet feeding unit connected to one blower duct, the control section opens the open/close valve of the one blower duct; when a sheet-shaped member is fed into another blower duct, if the sheet-shaped member, which has been conveyed through the one blower duct, is detected in the common duct by the sensor, the control section closes the open/close valve of the one blower duct and opens the open/close valve of another blower duct so as to convey the banknote; and when the sheet-shaped member, which has been conveyed through another blower duct, is detected in the common duct by the sensor, the control section opens the open/close valves of the one blower duct and other blower ducts on the upstream side and closes those of other blower ducts on the downstream side so as to convey the banknotes, which have been conveyed through the one blower duct and other blower ducts, through the common duct.

In the equipment, sensors for detecting banknotes are provided near connection parts, each of which connects the blower duct to the common duct; an upper duct having an open/close valve is provided on the upper stream side of the uppermost blower duct; when a sheet-shaped member is put in the sheet feeding unit connected to one blower duct, the control section opens the open/close valve of the one blower duct; when a sheet-shaped member is fed into another blower duct, if the sheet-shaped member, which has been conveyed through the one blower duct, is detected in the common duct by the sensor, the control section closes the open/close valve of the one blower duct and opens the open/close valve of another blower duct so as to convey the banknote; and when the sheet-shaped member, which has been conveyed through another blower duct, is detected in the common duct by the sensor, the control section closes the open/close valves of another blower duct and opens the open/close valve of the upper duct so as to convey the banknotes, which have been conveyed through the one blower duct and other blower ducts, through the common duct.

In the equipment, the bending unit comprises: a pair of feed rollers for feeding the sheet-shaped member into the blower duct; a motor for rotating the feed rollers in a normal direction and a reverse direction; open/close means being provided on the upstream side of the feed rollers, the open/close means opening a path when the sheet-shaped member is fed and closing the path when a rear end of the sheet-shaped member passes, the open/close means having a sloped guide section, which faces the feed rollers; a sensor for detecting if the sheet-shaped member passes through the open/close means or not; and a control section to which a signal of the sensor is sent, and the control section drives the motor to rotate the feed rollers in a sheet feeding direction, feeds the sheet-shaped member to be fed to the path a prescribed distance, rotates the motor a prescribed angle in the reverse direction and moves the sheet-shaped member backward by the feed rollers when the sensor detects the rear end of the sheet-shaped member passing the open/close means and sends the signal so as to press the rear end part of the sheet-shaped member onto the sloped guide section and concave the rear end part toward the feed roller located on the downstream side in the air-streaming direction, and rotates the motor in the normal direction to feed the sheet-shaped member into the blower duct.

In the equipment, the bending unit comprises: a pair of feed rollers for feeding the sheet-shaped member into the blower duct; a motor for rotating the feed rollers in a normal direction and a reverse direction; a press roller being pressed onto the feed roller, which is located on the downstream side in the air-streaming direction; a guide section being neighbored the press roller and having an arc face constituting a space, through which the sheet-shaped member can pass, with an outer circumferential face of the feed roller located on the downstream side; open/close means being provided on the upstream side of the feed rollers, the open/close means opening a path when the sheet-shaped member is fed and closing the path when a rear end of the sheet-shaped member passes, the open/close means having a sloped guide section, which faces the feed rollers; a sensor for detecting if the sheet-shaped member passes through the open/close means or not; and a control section to which a signal of the sensor is sent, and the control section drives the motor to rotate the feed rollers in a sheet feeding direction, feeds the sheet-shaped member to be fed to the path a prescribed distance, rotates the motor a prescribed angle in the reverse direction and moves the sheet-shaped member backward by the feed rollers when the sensor detects the rear end of the sheet-shaped member passing the open/close means and sends the signal so as to guide the rear end part of the sheet-shaped member by the guide section and further feed along the arc face of the guide section with pinching the rear end part by the press roller and the feed roller located on the downstream side, deforms the rear end part to concave toward the feed roller located on the downstream side or formed into a cylindrical shape, and rotates the motor in the normal direction to feed the sheet-shaped member into the blower duct.

In the equipment, the open/close means has a pair of claw pieces, which are respectively provided on the both sides of the path, at least one of the claw pieces is a movable claw piece, which is always biased toward the other claw piece, by a biasing member, so as to close the path, and the movable claw piece is pressed by a front end of the sheet-shaped member and moved against a biasing force of the biasing member when the sheet-shaped member is fed to the feed rollers, so that the path is opened, and the movable claw piece is returned by the biasing force of the biasing member when the rear end of the sheet-shaped member passes the movable claw piece, so that the path is closed.

EFFECTS OF THE INVENTION

In the method and the equipment of the present invention, the open/close valve of the blower duct, into which the sheet-shaped member has been fed, is preferentially opened so as to feed the sheet-shaped member into the common duct, the flow passage area of the common duct can be small and substantially equal to that of the blower duct, so that the equipment can be downsized. Further, the air stream unit can be the small suction blower.

BRIEF DESCRIPTION OF THE DRAWINGS

FIGS. 14A-14H are explanation views, wherein the sheet-shaped member is bent by the bending unit.

OPTIMUM EMBODIMENTS OF THE INVENTION

Optimum embodiments of the present invention will now be described in detail with reference to the accompanying drawings.

Figure 1:
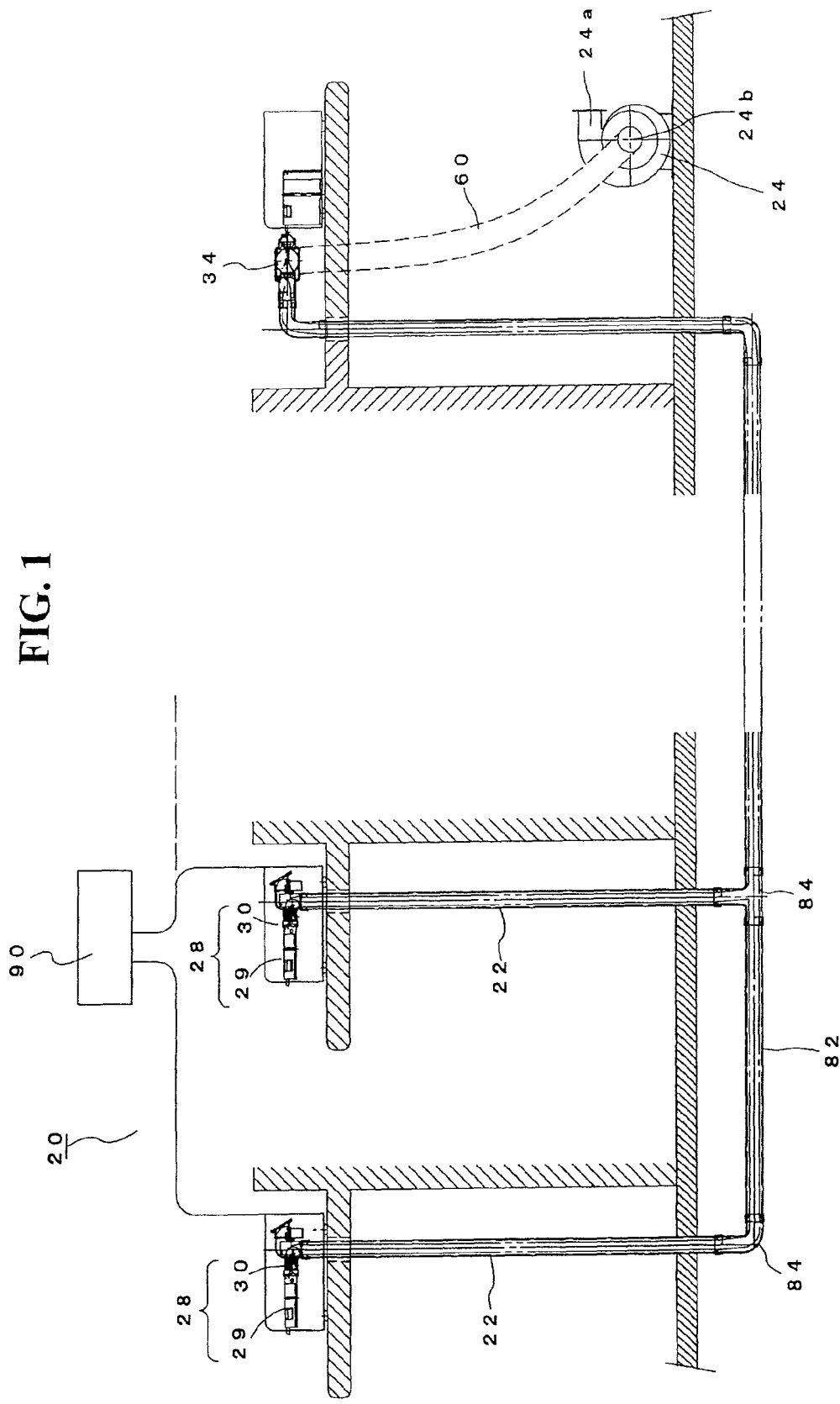
FIG. 1 is a schematic view of an equipment for conveying sheet-shaped members.

FIG. 1 is a schematic view of an entire equipment 20 for conveying sheet-shaped members.

In FIG. 1, a plurality of blower ducts 22 (two ducts are shown in FIG. 1) are arranged parallel.

An outlet of each blower duct 22 is connected to a common duct 82 by a joint duct 84.

A flow passage area of the common duct 82 is substantially equal to that of each of the blower ducts 22. Note that, in the specification, the word "substantially equal" means that the flow passage area of the common duct is about 0.5-1.5 times as wide as that of the blower duct 22.

A symbol 24 stands for an air stream unit, which is constituted by a suction blower and which sucks air in the common duct 82 so as to generate air streams in the blower ducts 22. The air stream unit 24 sucks the air in the common duct 82 via a discharge pipe 60 connected to a collecting unit 30, which is provided at a terminal end of the common duct 82, and discharges the air outside.

A symbol 28 stands for a sheet feeding unit capable of feeding sheet-shaped members into each of the blower ducts 22. In each of the sheet feeding units 28 of the present embodiment, a banknote identification unit 29 is provided on the outer side, and a bending unit 30 (see FIG. 2) is provided on the inner side.

The banknote identification unit 29 identifies denominations of banknotes and tells real banknotes from false ones, and a known device can be employed so detailed description will be omitted.

Note that, banknotes may be manually fed without using the banknote identification units 29.

The bending unit 30, whose details will be explained later, forms a temporary deformity 32b, which is formed into, for example, an L- or a J-shape in gothic script or sanserif script or curled like a tubular shape. In this case, the rear end part of the sheet-shaped member 32 may be deformed by curling toward one of feed rollers 33a and 33a, which is located on the downstream side in the air-streaming direction.

Wind pressures of the air streams, which streams in the blower ducts 22, are applied to the temporary deformities 32b, so that the sheet-shaped members 32 can be conveyed in the blower ducts 22.

One or a plurality of the sheet feeding units 28 are provided to each of the blower ducts 22. The equipment 20 of the present embodiment is installed in a pin ball parlor for collecting banknotes, one sheet feeding unit 28 acts as a banknote slot sections of a ball lending unit, and one sheet feeding unit 28 is provided to one pin ball game machine. In a casino, one sheet feeding unit 28 is provided to one game machine. In a convenience store, etc., one sheet feeding unit 28 is provided to one booth (cash register).

Figure 2:
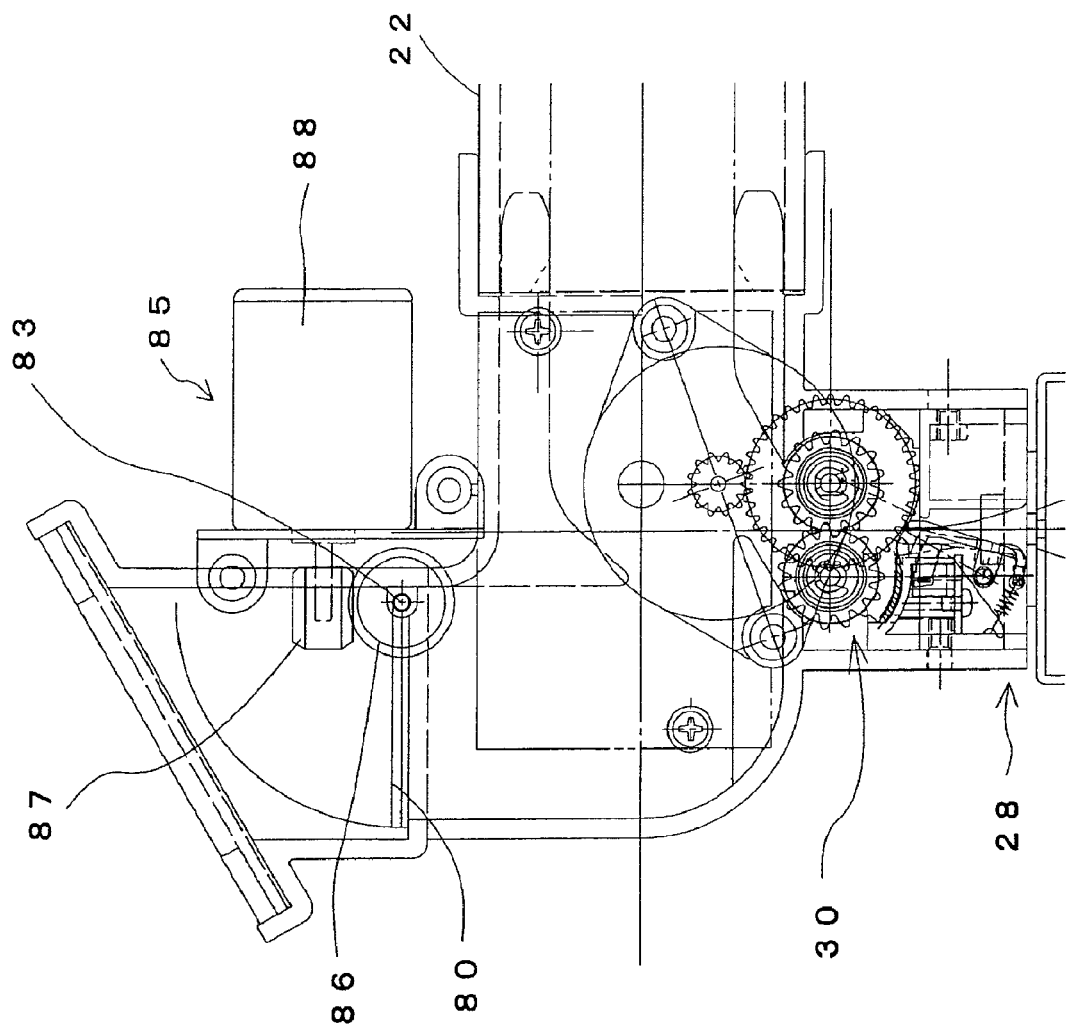
FIG. 2 is an explanation view of an open/close valve.
Figure 3:
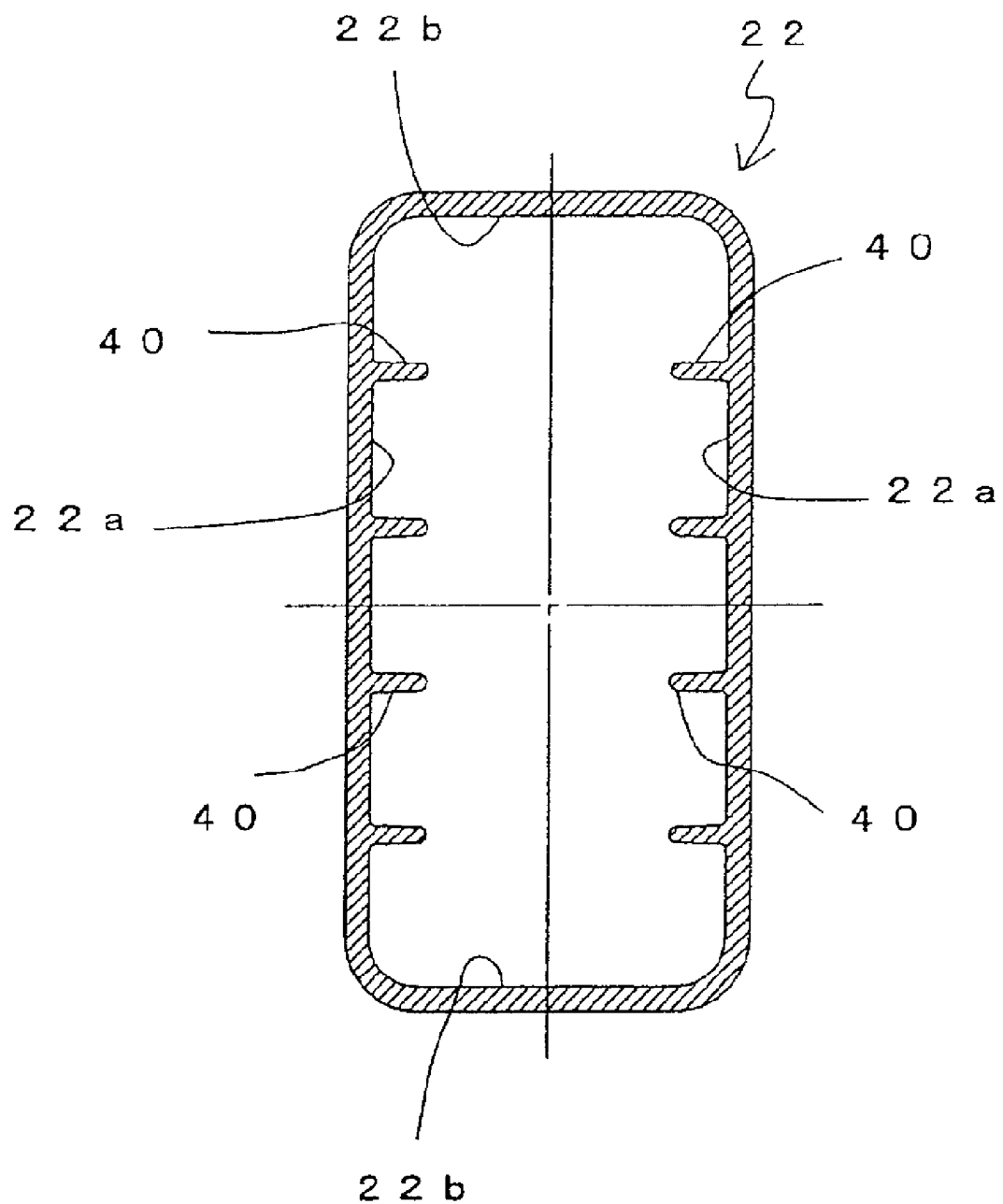
FIG. 3 is a sectional view of a blower duct and a common duct.

An open/close valve 80, which is capable of opening and closing a path of the blower duct 22, is provided to each of the blower ducts 22. For example, as shown in FIG. 2, each of the open/close valves 80 is constituted by a butterfly valve, which can be turned about a shaft 83, and capable of fully opening and closing each of the blower ducts 22.

A drive section 85 of the open/close valve 80 is constituted by a worm gear fixed to the shaft 83, a worm 87 engaged with the worm gear, a motor for rotating the worm 87, etc.

The drive section 85 is controlled by a control section 90 (see FIG. 1).

The sheet-shaped members 32 are conveyed through the blower ducts 22 by the air stream and collected by a collecting unit 34, which is provided to the terminal end of the common duct 22. Details of the collecting unit 34 will be described later.

Only the sheet-shaped members 32 are collected by the collecting unit 34, and the air is discharged outside.

Note that, the air may be returned to the sheet feeding units 28, without discharging outside from the air stream unit 24, by connecting a return duct (not shown) to an air outlet 24a (see FIG. 1) of the air stream unit 24. For example, in FIG. 1, the return duct is connected to the air outlet 24a of the air stream unit 24, and a front end of the return duct is connected to a port (not shown) located on the upstream side of the open/close valve 80, which is used to control the air stream in the blower duct 22. In this case, an air discharge port (not shown) may be provided on the upstream side of the open/close valve 80. The air discharge port discharges air when a flow volume in the return duct is excessive; the air discharge port introduces air when the flow volume of the blower duct 22 is poor. A flow passage area of the return duct (not shown) is substantially equal to that of each blower duct 22. By circulating the air, air-conditioned air in a room, in which the sheet feeding unit or units 28 are installed, will not be discharged outside, so that the sheet-shaped members can be conveyed without lowering an air-conditioning efficiency.

Note that, a symbol 24b stands for an air suction port of the air stream unit 24.

FIG. 2 is a sectional view of the blower duct 22 and the common duct 82. Note that, the blower duct 22 will be explained in the following description.

In the present embodiment, the blower duct 22 has a rectangular sectional shape.

In wall faces (opposite wall faces 22a and 22a) of the blower duct 22, which face surfaces of the sheet-shaped member 32, a plurality of ribs 40 having a prescribed height are inwardly projected from each of the wall faces 22a and 22a and extended in the air-streaming direction. A distance between front ends of the opposite ribs 40 formed in each of the wall faces 22a and 22a is designed to allow the deformity 32b of the sheet-shaped member 32 to pass through the space therebetween. A distance between opposite wall faces 22b and 22b is designed to allow the sheet-shaped member 32 to pass through the space therebetween without being deformed. A space enclosed by the front ends of the ribs 40 and the wall faces 22b and 22b, in which the sheet-shaped member is passed, is formed into a rectangular shape. Note that, the blower duct 22 is not limited to the rectangular duct, so it may be, for example, a circular cylindrical duct.

Figure 5:
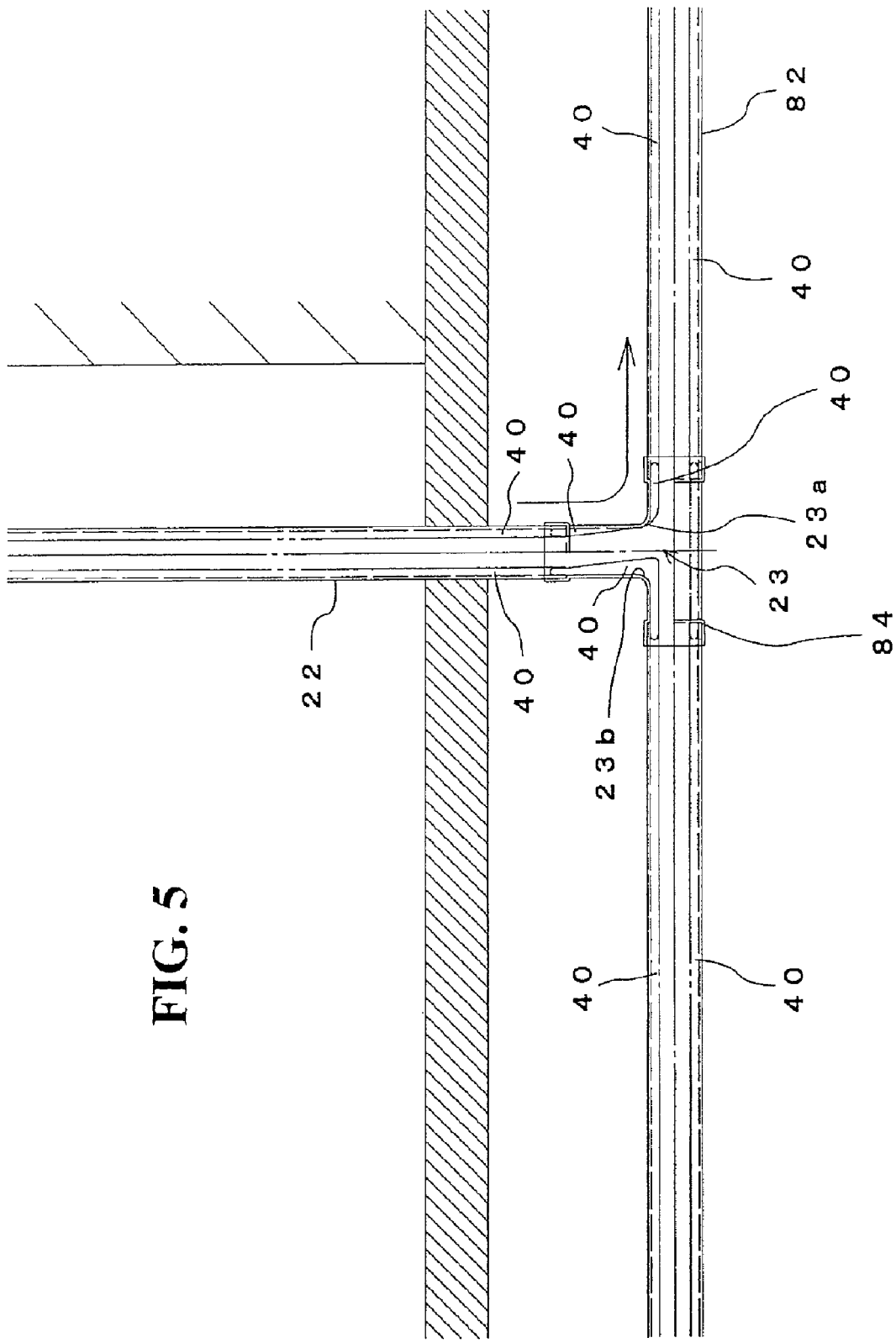
FIG. 5 is an explanation view of a joint duct.

FIG. 5 is an explanation view of the joint duct 84.

In the joint duct 84, the sheet-shaped member 32 is turned and conveyed from the blower duct 22 toward the common duct 82 as shown by an arrow. In this case, the sheet-shaped member 32 is curled to make one of the surfaces face an inner surface of a turning section.

The ribs 40 formed in the joint duct 84 of the turning section 23 will be explained.

Ribs 40, which are connected to the ribs 40 of the blower duct 22 and the common duct 82, are formed in wall faces of the joint duct 84.

The ribs 40 formed in a wall face 23a of the turning section 23 from the upstream side of the turning section 23 to the downstream side thereof will be explained. Namely, a height of the ribs 40 is gradually reduced from a specified position, which is located on the upstream side of the turning section 23 and separated a prescribed distance therefrom, to an inlet of the turning section 23. At the inlet of the turning section 23, the height of the ribs 40 is almost zero. On the other hand, the height of the ribs is gradually increased from the inlet of the turning section 23 to a specified position, which is located on the downstream side of the turning section and separated a prescribed distance therefrom.

A height of the ribs 40 formed on an outer wall face 23b of the turning section 23 may be equal to that of the ribs 40 formed in a straight part of the blower duct 22; preferably, as shown in FIG. 5, the height of the ribs 40 formed on an outer wall face 23b may be varied to follow that of the ribs 40 formed on the wall face 23a so as to maintain a distance between the ribs 40 on the wall face 23a and the ribs 40 on the wall face 23b.

In FIG. 1, the blower ducts 22 and the common duct 82 are linearly formed, but, in some cases, the blower ducts 22 and the common duct 82 must be bent according to an installing space. In that case, a turning duct 92 shown in FIG. 6 may be connected to a mid part of the blower duct 22 or the common duct 82. The duct shown in FIG. 6 turns 180 degrees, but the angle may be optionally designed.

In the turning section 23 of the turning duct 92, the sheet-shaped member 32 is curled and conveyed with in a state, in which one side surface becomes an inner surface.

The ribs 40 formed in the wall face 23a of the turning section 23 from the upstream side of the turning section 23 to the downstream side thereof will be explained. Namely, the height of the ribs 40 is gradually reduced from the specified position, which is located on the upstream side of the turning section 23 and separated the prescribed distance therefrom, to the inlet of the turning section 23. At the inlet of the turning section 23, the height of the ribs 40 is almost zero. On the other hand, the height of the ribs is gradually increased from the inlet of the turning section 23 to the specified position, which is located on the downstream side of the turning section and separated the prescribed distance therefrom. Note that, the height zero means nearly zero, preferably slightly higher than zero.

Figure 6:
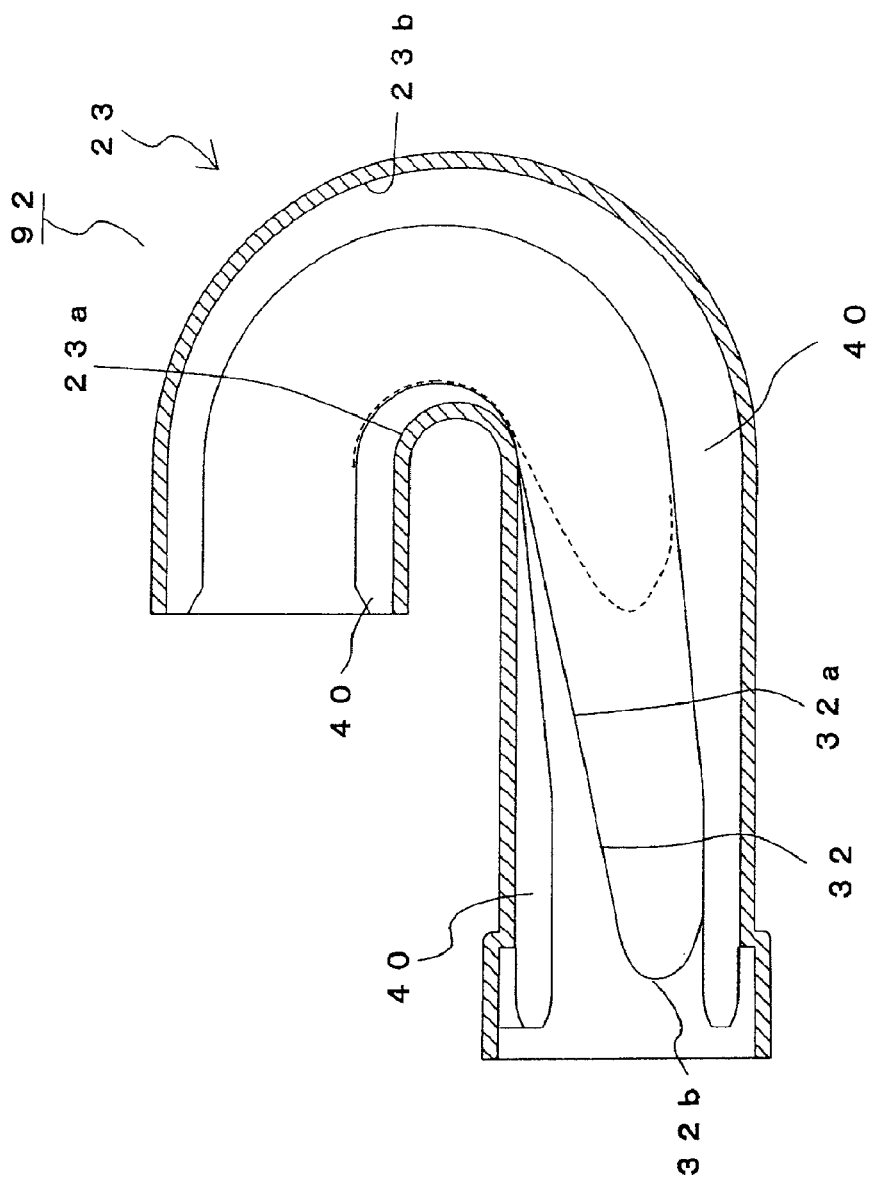
FIG. 6 is an explanation view of a turning duct.

The height of the ribs 40 formed on the outer wall face 23b of the turning section 23 may be equal to that of the ribs 40 formed in the straight part of the blower duct 22; preferably, as shown in FIG. 6, the height of the ribs 40 formed on the outer wall face 23b may be varied to follow that of the ribs 40 formed on the wall face 23a so as to maintain the distance between the ribs 40 on the wall face 23a and the ribs 40 on the wall face 23b. Namely, the height of the ribs 40 formed on the wall face 23b may be gradually increased from the position located on the upstream side of the turning section 23 to the turning section and gradually reduced from the turning section to the position located on the downstream side thereof.

Figure 7:
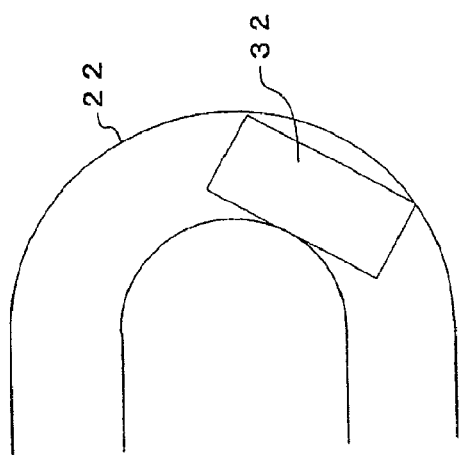
FIG. 7 is an explanation view showing a function of turning and conveying a sheet-shaped member.

In the example shown in FIG. 6, the turning section 23 is formed in the blower ducts 22 and the common duct 82, and the sheet-shaped member 32 is curled and U-turned with in the state, in which one side surface becomes the inner surface. In this case, the curvature radius of the turning section 23 is small. In another case, the sheet-shaped member 32 must be turned to face the side edges of the sheet-shaped member 32 inward due to a layout of the blower ducts 22 and the common duct 82. However, in this case, the curvature radius of the turning section of the blower duct 22 must be great as shown in FIG. 7, and a space efficiency must be lowered.

Figure 8:
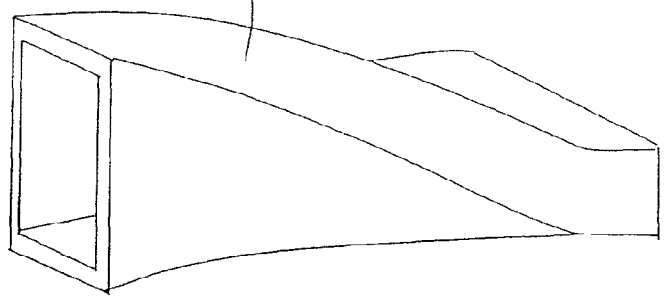
FIG. 8 is an explanation view of a twisted duct.

FIG. 8 shows means for solving the above described problems.

In the shown example, a twisted duct 68, which is twisted a prescribed angle (e.g., 90 degrees in FIG. 8) with respect to an axial line of the blower duct 22, is used. Ribs 40, which correspond to the ribs formed in the wall faces of the blower duct 22, are formed in wall faces of the twisted duct 68 and twisted at the same angle, but they are not shown in FIG. 8. By connecting the twisted duct 68 to the straight part of the blower duct 22, the sheet-shaped member 32 can be turned 90 degrees.

By connecting the turning duct 92 shown in FIG. 6 and the twisted duct 68 shown in FIG. 8 to the blower duct 22 and the common duct 82, the sheet-shaped member 32 can be turned, with the small curvature radius, to face the side edges of the sheet-shaped member 32, which has been conveyed through the straight part of the blower duct 22, inward. By selecting the twist angle of the twisted duct 68 and the tuning angle of the turning duct 92, the turned blower duct having the small curvature radius can be produced.

The equipment of the present embodiment has the above described structure.

Details of the sheet feeding unit 28 and the collecting unit 34 will be explained later, but a mechanism for conveying the sheet-shaped members will be explained.

The open/close valve 80 of each blower duct 22 closes the blower duct 22 while no sheet-shaped members 32 are put in the sheet feeding units 28. The air stream unit 24 is stopped.

For example, in a cash register of a convenience store, when inserting the sheet-shaped member 32 into the sheet feeding units 28 of one of the blower ducts 22 is detected, the control section 90 starts the air stream unit 24 and drives the drive section 85 so as to open the open/close valve 80 of the blower duct 22, to which said sheet feeding unit 28 is attached, and close the open/close valves 80 of other blower ducts 22.

An air stream is generated in the blower duct 22, whose open/close valve 80 is opened, by sucking air with the air stream unit 24, and the sheet-shaped member 32 is conveyed through the blower duct 22, the joint duct 84 and the common duct 82 and collected by the collecting unit 34, which is provided to the terminal end of the common duct 82.

Note that, the word "closing the open/close valve 80" means to maintain a closing state of the closed valve 80 and to close the opened valve. Further, the word means to perfectly close the blower duct 22 by the valve 80 and to half-close the blower duct, in which the air stream is limited by the valve 80. For example, other blower ducts 22 may be half-closed to limit the air streams as far as the air stream capable of conveying the sheet-shaped member 32 is generated in the blower duct 22, in which the sheet-shaped member has been fed and whose open/close valve 80 is opened.

In the following description too, the word "closing the open/close valve 80" has the same meaning.

As described above, only the open/close valve 80 of the blower duct 22, into which the sheet-shaped member 32 has been fed, is opened so as to feed the sheet-shaped member 32 into the common duct 82, so the flow passage area of the common duct 82 may be substantially equal to that of the blower duct 22 so that the equipment can be entirely downsized. Further, the air stream unit 24, e.g., suction blower, sucks the air from one blower duct 22, so a small unit can be used.

If air streams are generated in all of the blower ducts 22, the flow passage area of the common duct 82 must be equal to the sum of those of the blower ducts 22, a large air stream unit 24 must be required, the equipment must be large in size and a running cost of the equipment must be increased.

In some cases, a plurality of the sheet-shaped members 32 are inserted into the sheet feeding units 28 of a plurality of the blower ducts 22 one after another.

In case that inserting the sheet-shaped members 32 into the sheet feeding units 28 of a plurality of the blower ducts 22 is detected, the control section 90 opens the open/close valves 80 of the blower ducts 22 in order of detecting the insertion of the sheet-shaped members 32 so as to feed the sheet-shaped members 32 into the blower ducts 22, and then the control section closes the open/close valve 80 of the blower duct 22 after the sheet-shaped member 32 conveyed through said duct is collected by the collecting unit 34 and control the drive section 85 so as to open the open/close valve 80 of the next blower duct 22.

Note that, the open/close valves 80 may be driven in order of detecting the insertion of the sheet-shaped members 32, in order of distances between the collecting unit 34 and the blower ducts 22, into which the sheet-shaped members 32 are fed, etc., and the order may be optionally defined under various conditions.

In case that inserting the sheet-shaped members 32 into the sheet feeding units 28 of a plurality of the blower ducts is detected, the open/close valve 80 of the next blower duct 22 may be opened before the foregoing sheet-shaped members 32 is conveyed through one of the blower ducts 22 and the common duct 82 and collected by the collecting unit 34, so that the both sheet-shaped members 32 can be conveyed thorough the common duct 32 when the latter sheet-shaped member 32 reaches the common duct 82 and a conveying time can be shortened. In this case, several control patterns are proposed, and two of the control patterns will be explained with reference to FIG. 9.

In the first control pattern, three sensors 100a, 100b and 100c are provided near connection parts between the common duct 82 and each blower duct 22. The sensor 100a is provided near the connection part between the blower duct 22 and the joint duct 84. The sensor 100b is provided near the connection part between the common duct 82 and an outlet of the T-shaped joint duct 84; the sensor 100c is provided near an inlet thereof. Note that, the joint duct 84 connected to the uppermost blower duct is formed into an L-shape, so two sensors 100a and 100b are provided thereto.

By detecting the sheet-shaped members 32 with the sensors 100a and 100b, the sheet-shaped members 32 reach the common duct 82.

The first control pattern for controlling the open/close valves 80 by the control section 90 will be explained.

When the sheet-shaped member 32 is inserted into one of the blower ducts 22, the open/close valve 80 of the one blower duct 22 is opened; in case that inserting the sheet-shaped member 32 into another blower duct 22 is detected, the open/close valve 80 of the one blower duct 22 is closed and the open/close valve 80 of another blower duct 22 is opened so as to convey the sheet-shaped member 32 when the sensors 100a and 100b detect that the sheet-shaped member 32 conveyed through the one blower duct 22 reaches the common duct 82; and the open/close valve 80 of one of the blower ducts 22, which is located on the upstream side, is opened and the open/close valve 80 of the blower duct 22 on the downstream side is closed when the sensors 100a and 100b detect that the sheet-shaped member 32 conveyed through another blower duct 22 reaches the common duct 82. Therefore, the sheet-shaped members 32, which have been conveyed through the both blower ducts 22 and 22, can be simultaneously conveyed through the common duct 82.

If the one blower duct 22 is located on the upstream side of another blower duct 22, the sheet-shaped member 32 is temporarily stayed in the common duct 82 by closing the open/close valve 80 of the one blower duct 22, but the sheet-shaped member 32 can be conveyed through the common duct 82 by reopening the open/close valve of the blower duct 22 on the upstream side. If the one blower duct 22 is located on the downstream side of another blower duct 22, the sheet-shaped members 32 can be continuously conveyed through the common duct 82 by opening the open/close valve 80 of the blower duct 22 on the upstream side.

In case that the sheet-shaped members 32 are inserted into the sheet feeding units 28 of three blower ducts 22 or more, the valves may be controlled similarly.

By performing the first control pattern, the sheet-shaped member 32 fed into another blower duct 22 can be conveyed without waiting until the sheet-shaped member 32 fed into the one blower duct 22 is collected by the collecting unit 34, so that the sheet-shaped members 32 can be conveyed efficiently.

In case that the sheet-shaped member 32 fed into the one blower duct 22 reaches a position between the sensors 100c and 100b of another blower duct 22, which will convey another sheet-shaped member 32, if the open/close valve 80 of the one blower duct 22 is closed, the sheet-shaped member 32 stops at the position between the sensors 100c and 100b and collides with another sheet-shaped member 32, which is conveyed through another blower duct 22, so that the sheet-shaped members 32 will get jammed in the common duct 82.

Therefore, existence of the foregoing sheet-shaped member 32 between sensors 100b and 100c of another blower duct 22 must be checked before opening the open/close valve 80 of another blower duct 22. Namely, when the sheet-shaped member 32 is inserted into the sheet feeding unit 28 attached to another blower duct 22, if the foregoing sheet-shaped member 32 is detected by the sensor 100c on the upstream side and not detected by the sensor 100b on the downstream side, the sheet-shaped member 32 stays between the both sensors and opening the open/close valve 80 of another blower duct 22 is delayed, and then the open/close valve 80 of another blower duct 22 is opened after the foregoing sheet-shaped member 32 is detected by the sensor 100b on the downstream side. With this control, a plurality of the sheet-shaped members 32 can be conveyed through the common duct 82 without jam.

Next, the second control pattern will be explained.

Figure 9:
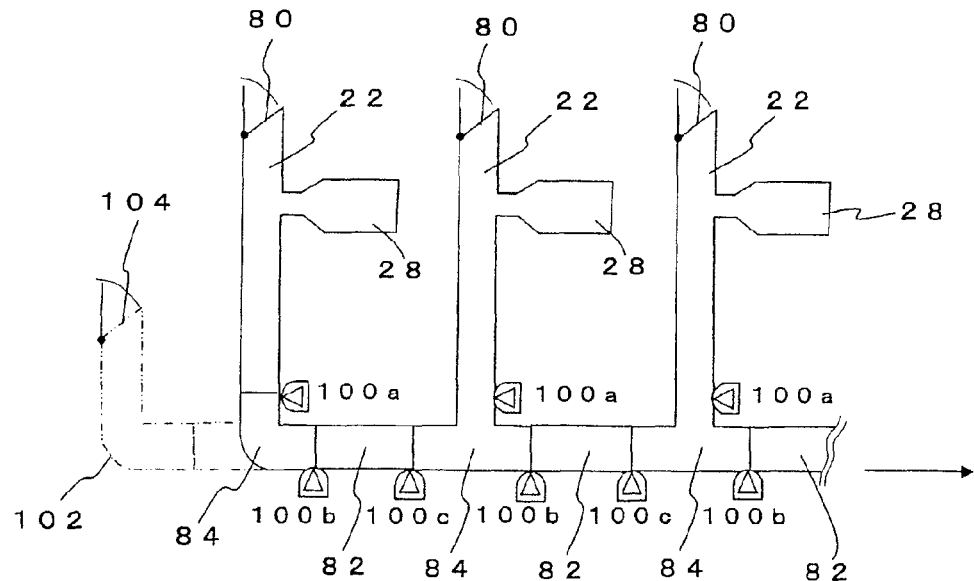
FIG. 9 is an explanation view showing positions of sensors, which are used in an open/close valve control system.

In the second control pattern too, three sensors 100a, 100b and 100c are provided near connection parts between the common duct 82 and each blower duct 22. In FIG. 9, as shown by dotted lines, an upper duct 102 is provided on the upper stream side of the uppermost blower duct 22 with respect to the common duct 82, and the upper duct 102 has an open/close valve 104.

The second control pattern for controlling the open/close valves 80 and 104 by the control section 90 will be explained.

When the sheet-shaped member 32 is inserted into one of the blower ducts 22, the open/close valve 80 of the one blower duct 22 is opened; in case that inserting the sheet-shaped member 32 into another blower duct 22 is detected, the open/close valve 80 of the one blower duct 22 is closed and the open/close valve 80 of another blower duct 22 is opened so as to convey the sheet-shaped member 32 when the sensors 100a and 100b detect that the sheet-shaped member 32 conveyed through the one blower duct 22 reaches the common duct 82; and the open/close valve 80 of another blower duct 22 is closed and the open/close valve 104 of the upper duct 102 is opened so as to simultaneously convey the sheet-shaped members 32, which have been conveyed through the both blower ducts 22 and 22, through the common duct 82 when the sensors 100a and 100b detect that the sheet-shaped member 32 conveyed through another blower duct 22 reaches the common duct 82.

Note that, a constant-pressure valve, which is capable of automatically opening and closing a flow path by air-pressure difference between the upper duct 102 and the common duct 82, may be used as the open/close valve 104. Namely, when all of the open/close valves 80 are closed and air pressures in the ducts are lowered, the constant-pressure valve 104 automatically opens the upper duct so as to convey the sheet-shaped member 32 through the common duct 82. On the other hand, when the sheet-shaped member 32 is inserted into the sheet feeding unit 28 of one of the blower ducts 22, the open/close valve 80 of the one blower duct 22 is opened and air pressures in the ducts are increased (returned to the normal pressure), the constant-pressure valve 104 automatically closes the upper duct.

In case that the sheet-shaped members 32 are inserted into the sheet feeding units 28 of three blower ducts 22 or more, the valves may be controlled similarly.

By performing the second control pattern, the sheet-shaped member 32 fed into another blower duct 22 can be conveyed without waiting until the sheet-shaped member 32 fed into the one blower duct 22 is collected by the collecting unit 34, so that the sheet-shaped members 32 can be conveyed efficiently.

In case that the sheet-shaped members 32 are inserted into the sheet feeding units 28 of a plurality of the blower ducts 22, the jam of the sheet-shaped members 32 in the common duct 82 can be prevented as well as the first control pattern.

Next, the function of conveying the sheet-shaped members 32 will be explained.

The bending unit 30 of the sheet feeding unit 28 forms the deformity 32b, which is formed into an L- or a J-shape in gothic script or sanserif script or curled like a tubular shape, in the flat rear end part of the sheet-shaped member 32, and the sheet-shaped member 32 having the deformity is fed into the blower duct 22.

Figure 10:
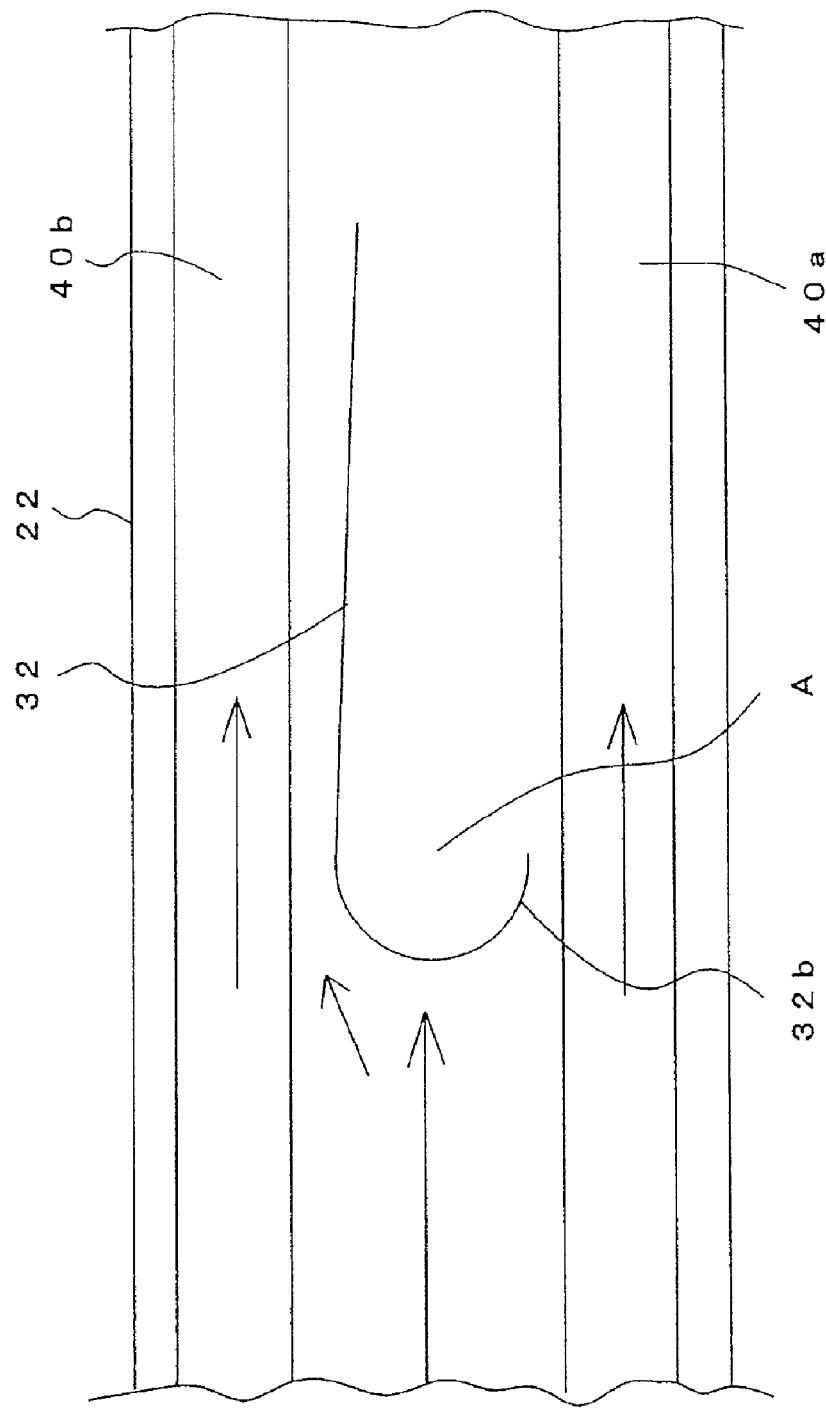
FIG. 10 is an explanation view showing a function of conveying the sheet-shaped member.

As shown in FIG. 10, a space A exists between the sheet-shaped member 32 fed in the blower duct 22 and the ribs 40a located on the deformity 32b side, and air streams between the ribs 40a, so the sheet-shaped member does not tightly stick onto the ribs 40a. On the other hand, air streams along the wall face on the deformity 32b side and enters a space between the ribs 40b, the deformity 32b is moved away from the ribs 40b by the air stream, further the air streams between the ribs 40b so the sheet-shaped member 32 does not tightly stick onto the ribs 40b.

The sheet-shaped member 32 is little resisted by the ribs 40a and 40b, so that the sheet-shaped member can be smoothly conveyed in the blower duct 22, by wind pressure applying to the deformity 32b, without flip-flopping the front end. The sheet-shaped member 32 is conveyed at a speed nearly equal to a wind speed, so a thrust force is initially generated by the wind pressure applying to the deformity 32b, and then the sheet-shaped member is conveyed in the blower duct 22 together with the air stream so that the sheet-shaped member can be smoothly conveyed in the blower duct 22.

When the deformity 32b is formed, the sheet-shaped member may be entirely formed into a U-shape.

In case of stably conveying the sheet-shaped member, a starting point of the deformity 32b is formed in the rear end part of, for example, a banknote, preferably the starting point is separated 5-50 mm (if a length of the banknote is about 16 cm, about 3-35% of the length) from the rear end of the banknote. Note that, the starting point of the deformity means, for example, a contact point between an arc part of the rounded surface and a linear part thereof.

As described above, by forming the ribs 40 in the wall faces 22a and 22b of the blower duct 22, a contact area of the sheet-shaped member 32 can be reduced so that contact resistance can be reduced and the sheet-shaped member 32 can be smoothly conveyed.

By forming the ribs 40, the flow passage area of the blower duct 22 can be increased. In a banknote collecting equipment installed in a game center, a supermarket, etc., a long convey duct is required; if the convey duct is narrow, it is difficult to convey banknotes to the end of the duct.

By forming the ribs 40, the duct sectional area can be increased and pressure loss can be reduced, so that the sheet-shaped members can be conveyed further.

In the turning section 23 shown in FIG. 5 and the turning section 23 shown in FIG. 6, the sheet-shaped member 32 can be smoothly conveyed. The turning section 23 will be explained.

The height of the ribs 40 formed in the inner wall face 23a is designed as described above, namely the height of the ribs 40 on the upstream side of the turning section 32 is gradually reduced toward the inlet of the turning section 23, so that the speed of the air stream between the front end part of the sheet-shaped member 32 and the wall face 23a is increased and air pressure is reduced when the sheet-shaped member 32 approaches the turning section 23. On the other hand, the speed of the air stream between the front end part of the sheet-shaped member 32 and the wall face 23b is reduced and air pressure is increased, so that the front end of the sheet-shaped member 32 is drawn toward the inner wall face 23a of the turning section 23.

Therefore, the front end part of the sheet-shaped member 32 contacts the inner wall face 23a of the turning section 32 and is turned therealong as shown by a dotted line shown in FIG. 6, so that the sheet-shaped member can be smoothly conveyed with little resistance even if the turning section 23 has a small curvature radius as shown in FIG. 6.

The sheet-shaped member can be smoothly conveyed in the turning section 23 of the joint duct 84 as well.

The equipment for conveying the sheet-shaped members can be suitably applied to a money collecting system, which is capable of directly conveying banknotes to a safe place, e.g., safe-deposit vault, installed in a store, e.g., supermarket, convenience store, a game hall, e.g., pinball parlor, casino, an ATM, etc.

Figure 11A:
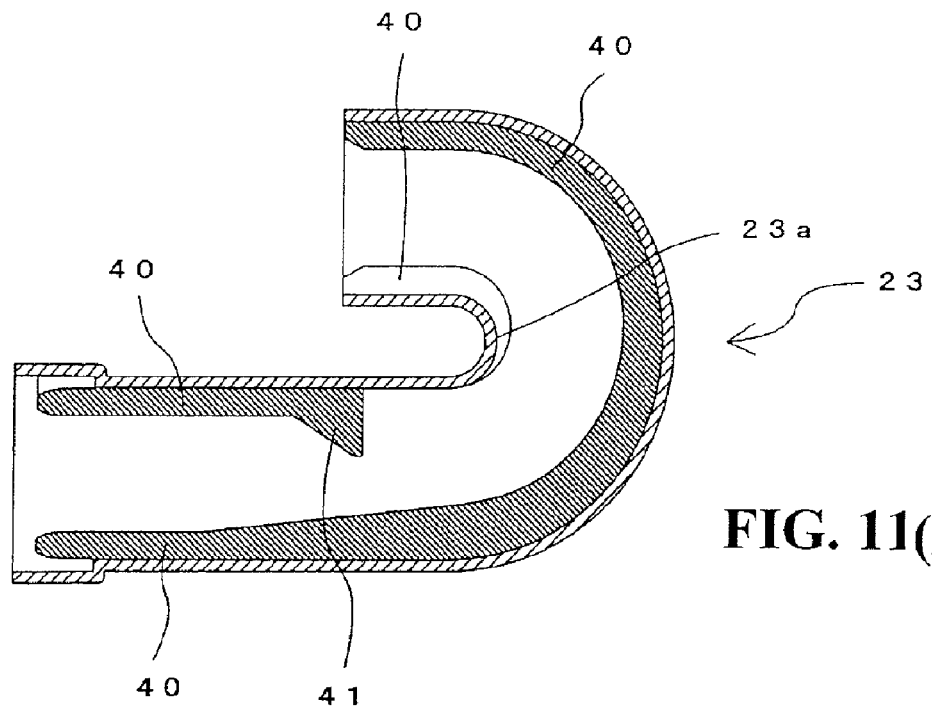
FIGS. 11A and 11B are explanation views of ribs formed in a turning section.
Figure 11B:
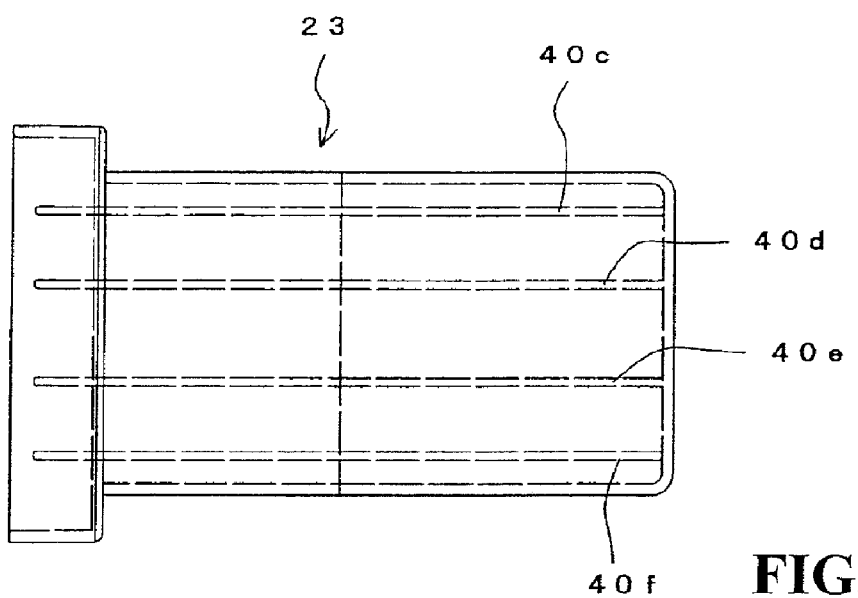

Other examples of the ribs 40 in the turning section 23 are shown in FIGS. 11A and 11B.

In the sheet feeding unit 28, it is difficult to put an old and flaccid banknote in an inlet of the sheet feeding unit 28, so the banknote 32 is, for example, folded two or three times along a transverse center line so as to strengthen the banknote 32 and then put in the sheet feeding unit 28.

The bending unit 30 is capable of curling the sheet-shaped member, but the folded line or lines cannot be restored.

Figure 4:
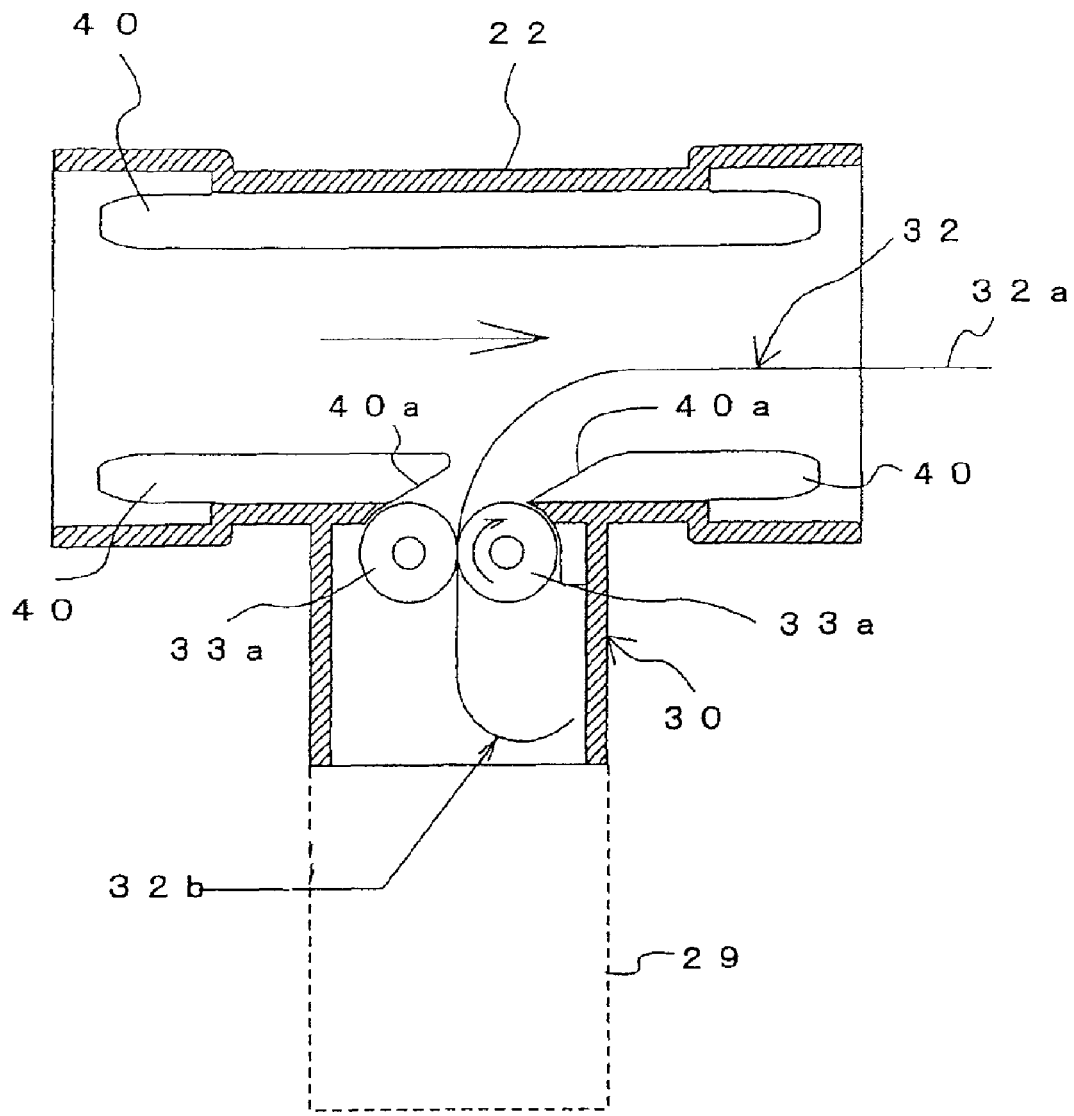
FIG. 4 is an explanation view of a bending unit.

In the case shown in FIG. 4, if the strengthened sheet-shaped member 32 is fed into the blower duct 22, the front end part of the sheet-shaped member 32 is drawn toward the inner wall face 23a of the turning section 23 and not curled along the wall face 23a, the linear shaped front end part is maintained and contacts the ribs 40 of the outer wall face of the turning section 23, so that the sheet-shaped member will close the turning section.

Thus, in the present embodiment, as shown in FIGS. 11A and 11B, raised parts 41, which are inwardly projected from the blower duct 22, are formed in the center ribs 40d and 40e of the ribs 40c, 40d, 40e and 40f formed in the inner wall face 23a of the turning section 23, and the raised parts are provided on the upstream side of and immediately before the inlet of the turning section 23. The height of the ribs 40, which are formed from the inlet of the turning section toward the downstream side, is gradually increased from zero as well as the ribs shown in FIG. 4.

By forming the raised parts 41 in the ribs 40d and 40e, the front end of the sheet-shaped member 32 entering the turning section 23 runs on the raised parts 41.

A slight wind speed difference exists between the both sides of the sheet-shaped member 32, and the wind speed difference makes the wind pressure applying to the outer surface of the sheet-shaped member 32 higher than that applying to the inner surface thereof, so that a force like a tilting board is applied to the outer surface of the front end part of the sheet-shaped member 32, which has run on the raised parts 41, the top tips of the raised parts 41 act as fulcrum points, the front end part of the sheet-shaped member 32 is bent toward the inner wall face 23a even if the sheet-shaped member is strengthened, and the sheet-shaped member 32 is formed as shown in FIG. 4 and can be smoothly passed through the turning section 23.

Concave parts corresponding to the raised parts 41 need not be formed in the ribs 40, which are formed in the outer wall face of the turning section 23, so the height of the ribs 40 may be equal to that of the ribs 40 shown in FIG. 4.

Four ribs 40c-40f are formed in the above described example, but number of the ribs is not limited. The raised parts 41 may be formed in all of the ribs 40 formed in the inner wall face 23a. The shape of the raised parts 41 is not limited as far as the sheet-shaped members 32 can be smoothly conveyed.

Next, details of the bending unit 30 of the sheet feeding unit 28 will be explained with reference to FIGS. 12-14.

Figure 12:
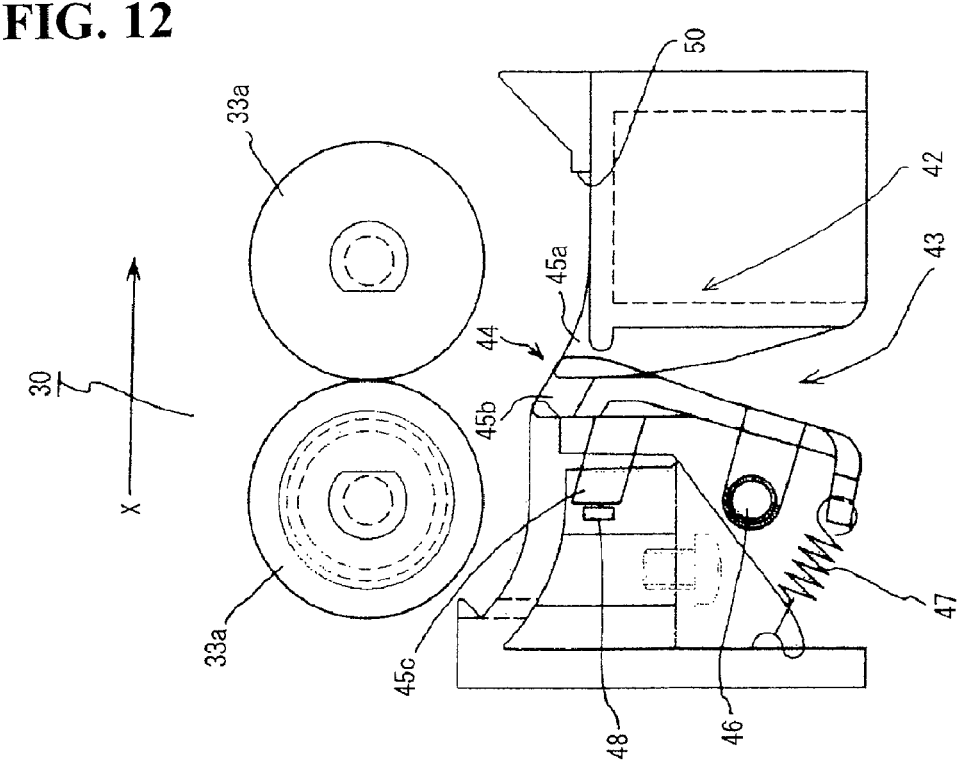
FIG. 12 is a detailed explanation view of the bending unit.

In FIG. 12, a pair of feed rollers 33a and 33a feed the sheet-shaped member 32 into the blower duct 22 in the direction perpendicular to the air-streaming direction. Gears (not shown), which are respectively coaxially connected to the feed rollers 33a and 33a, are engaged each other, and one of the feed rollers 33a is rotated by a motor, not shown, which can rotate in a normal direction and a reverse direction, so that the other feed roller 33a can be synchronously rotated. The other roller 33a is biased and pressed toward the one feed roller 33a by a spring, not shown, so that the sheet-shaped member 32 is pinched between the feed rollers 33a and 33a and the sheet-shaped member 32 can be fed. Note that, as described above, the sheet-shaped member 32 is fed into the blower duct 22 in the direction perpendicular to the air-streaming direction, but an angle of feeding the sheet-shaped member 32 may be optionally designed on the basis of an arrangement or an install space of the sheet feeding unit 28.

Banknotes, which have been checked by the banknote identification unit 29, are sent to the feed rollers 33a and 33a of the bending unit 30 from a pair of feed-out rollers (not shown) provided to the banknote identification unit 29.

Open/close means 42 is provided between the feed rollers 33a and 33a and the feed-out rollers. The open/close means 42 is capable of opening and closing a path 43 formed between the feed rollers 33a and 33a and the feed-out rollers and has a sloped guide section 44, which introduces the rear end of the sheet-shaped member toward the opposite side of the feed rollers 33a and 33a when the path 43 is closed (or shut).

For example, the open/close means 42 has a pair of claw pieces 45a and 45b, which are respectively provided on the both sides of the path 43, and at least one of the claw pieces 45a and 45b is a movable claw piece. In the present embodiment, the claw piece 45a is a fixed claw piece, and the claw piece 45b is the movable claw piece which can be turned about a shaft 46. One end of the movable claw piece 45b is pulled by a spring 47, so that the other end thereof is turned to overlap the fixed claw piece 45a.

For example, the fixed movable claw pieces 45a and the movable claw pieces 45b may be formed like combs, and each of the movable claw pieces may enter a space between the adjacent fixed movable claw pieces as shown in FIG. 12 so as to close the path 43.

When the other end of the movable claw piece 45b overlaps the fixed claw piece 45a, the sloped guide section 44 introduces the rear end part of the sheet-shaped member to side faces of the claw pieces 45a and 45b, which face the feed rollers 33a and 33a, so as to deform the rear end part.

As shown in FIG. 12, the sloped guide section 44 is inclined, toward the downstream side of the air stream passing through the blower duct 22, to gradually separate away from one of the rollers 33a and 33a, which is located on the downstream side. A stopper 50 is provided to an end of the sloped guide section 44. Note that, preferably, a width of the sloped guide section 44, which is perpendicular to a paper surface of FIG. 12, is slightly wider than that of the sheet-shaped member 32.

Figure 13:
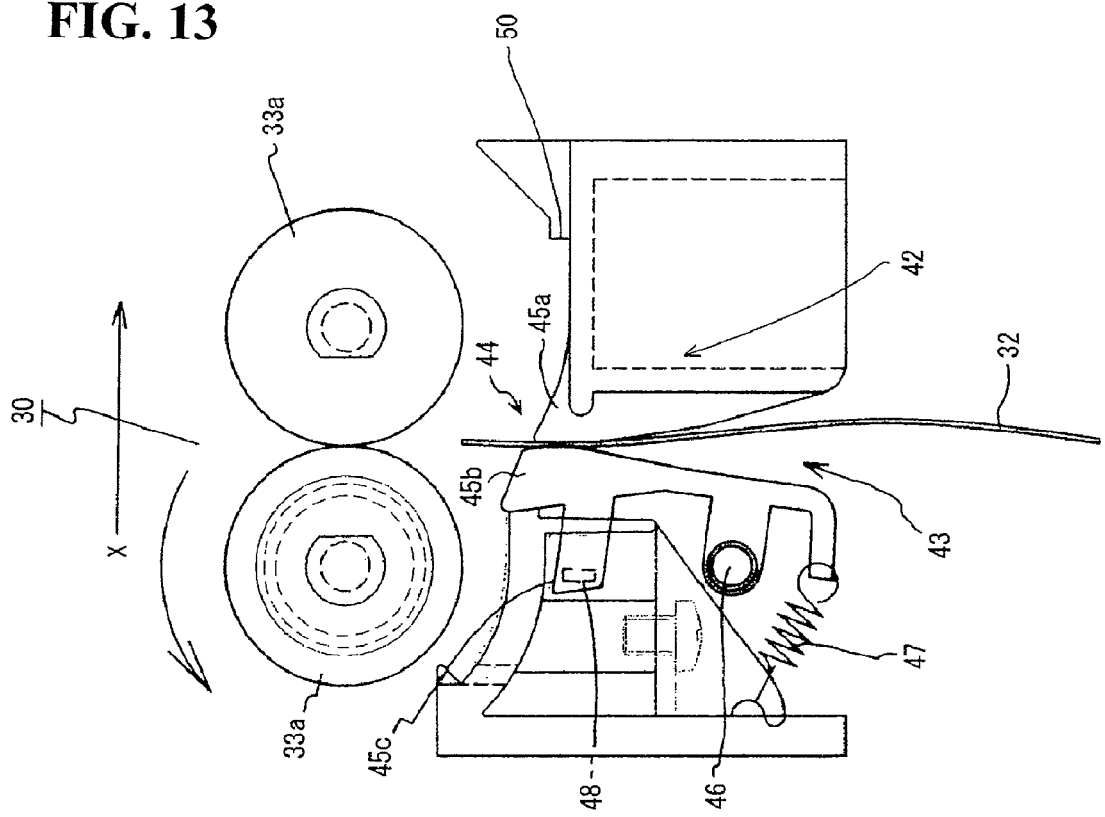
FIG. 13 is an explanation view of the bending unit into which the sheet-shaped member is fed.

A sensor 48 includes a light emitting section and a light receiving section, the sensor is not masked by a lever 45c located on the movable claw piece 45b side as shown in FIG. 12 when no sheet-shaped member 32 passes; the sensor is masked by the lever 45c as shown in FIG. 13 when the sheet-shaped member 32 turns the movable claw piece 45c against elasticity of the spring 47. An ON signal and an OFF signal are inputted to a control section (not shown), which controls the entire sheet feeding unit 28.

Next, the action of the bending unit 30 for forming the deformity 32b in the rear end part of the sheet-shaped member 32 will be explained with reference to FIG. 14.

In FIG. 14A, the sheet-shaped member (banknote) is put in the banknote identification unit 29 and identified thereby, at that time the feed rollers 33a and 33a are not rotated.

When the identified sheet-shaped member is sent toward the feed rollers 33a and 33a by rollers (not shown), the front end of the sheet-shaped member 32 turns the movable claw piece 45b against the elasticity of the spring 47, so that the lever 45c masks (turns off) the sensor 48. When the OFF signal of the sensor is inputted to a control section, not shown, the control section drives a motor, not shown, so as to rotate the feed rollers 33a and 33a in the sheet feeding direction (see FIG. 14B).

When the sheet-shaped member 32 is fed by the feed rollers 33a and 33a and the rear end of the sheet-shaped member 32 passes the claw pieces 45a and 45b as shown in FIG. 12C, the movable claw piece 45b is returned to the initial position by the elasticity of the spring 47, so that the path 43 is closed by the claw pieces 45a and 45b, the sensor 48 is returned to a light receiving state (turned on) and the ON signal is inputted to the control section.

By inputting the ON signal to the control section, the control section stops the motor once (see FIG. 14C), and then the motor is rotated a prescribed angle in the reverse direction. With this action, the sheet-shaped member 32 is moved a prescribed distance backward (see FIGS. 14D-14F).

When the sheet-shaped member 32 is moved backward, firstly the rear end of the sheet-shaped member 32 contacts the sloped guide section 44 as shown in FIG. 14D, next the rear end of the he sheet-shaped member 32 is moved backward along the sloped guide section 44, and the rear end contacts the stopper 50 as shown in FIG. 14E, so that the movement of the sheet-shaped member along the sloped guide section 44 is stopped.

By further rotating the feed rollers 33a and 33a in the reverse direction, the rear end of the sheet-shaped member 32 is slightly fed toward the feed roller 33a located on the upstream side, so that the deformity formed in the rear end part of the sheet-shaped member 32 is emphasized.

Since the sloped guide section 44 is inclined from the upstream side to the downstream side so as to gradually separate from the roller 33a located on the downstream side, the rear end part of the sheet-shaped member 32 is concaved toward the roller 33a located on the downstream side. The shape of the deformity 32b may be formed into, for example, an L- or a J-shape in gothic script or sanserif script by changing the distance of the backward movement of the sheet-shaped member 32, the shape of the surface of the sloped guide section 44, etc.

After the motor is rotated the prescribed angle in the reverse direction, the control section rotates the feed rollers 33a and 33a in the normal direction so as to feed the sheet-shaped member 32, in which the deformity has been formed in the rear end part, into the blower duct 22 as shown in FIGS. 14G and 14H.

Since the rear end part of the sheet-shaped member 32 is concaved toward the roller 33a on the downstream side to form the deformity 32b, the deformity 32b is not restored even if the rear end part of the sheet-shaped member 32, in which the deformity 32b has been formed, is passed between the rollers 33a and 33a. Namely, the front end part of the sheet-shaped member 32 is bent, by the air stream, in the direction equal to the deforming direction of the deformity 32b or in the air-streaming direction as shown in FIG. 14G, so that the rear end of the sheet-shaped member 32 passes along the roller 33a located on the downstream side and the deformity 32b can be maintained without restoring.

In the present embodiment, if the rear end part of the sheet-shaped member 32 is concaved toward the roller 33a located on the upstream side, the deformity 32b is improperly restored when the deformity 32b passes between the rollers 33a and 33a.

Note that, the ribs 40 formed from the bending unit 30 to the inlet of the blower duct may have sloped end faces 40a whose height is gradually increased in the air-streaming direction, as shown in FIG. 4, so as not to engage the front end or the rear end of the sheet-shaped member 32 with the end faces of the ribs 40 when the sheet-shaped member 32 is sent from the bending unit 30 to the blower duct 22.

A connecting part of the blower duct 22, to which the bending unit 30 (the sheet feeding unit 28), may be integrated with the bending unit 30 and connected to the straight part of the blower duct 22.

The sheet feeding unit 28 need not have the banknote identification unit 29. The sheet-shaped members may be manually supplied to or supplied to the feed rollers 33a and 33a of the bending unit 30 by, for example, a belt mechanism or a roller mechanism.

Figure 15:
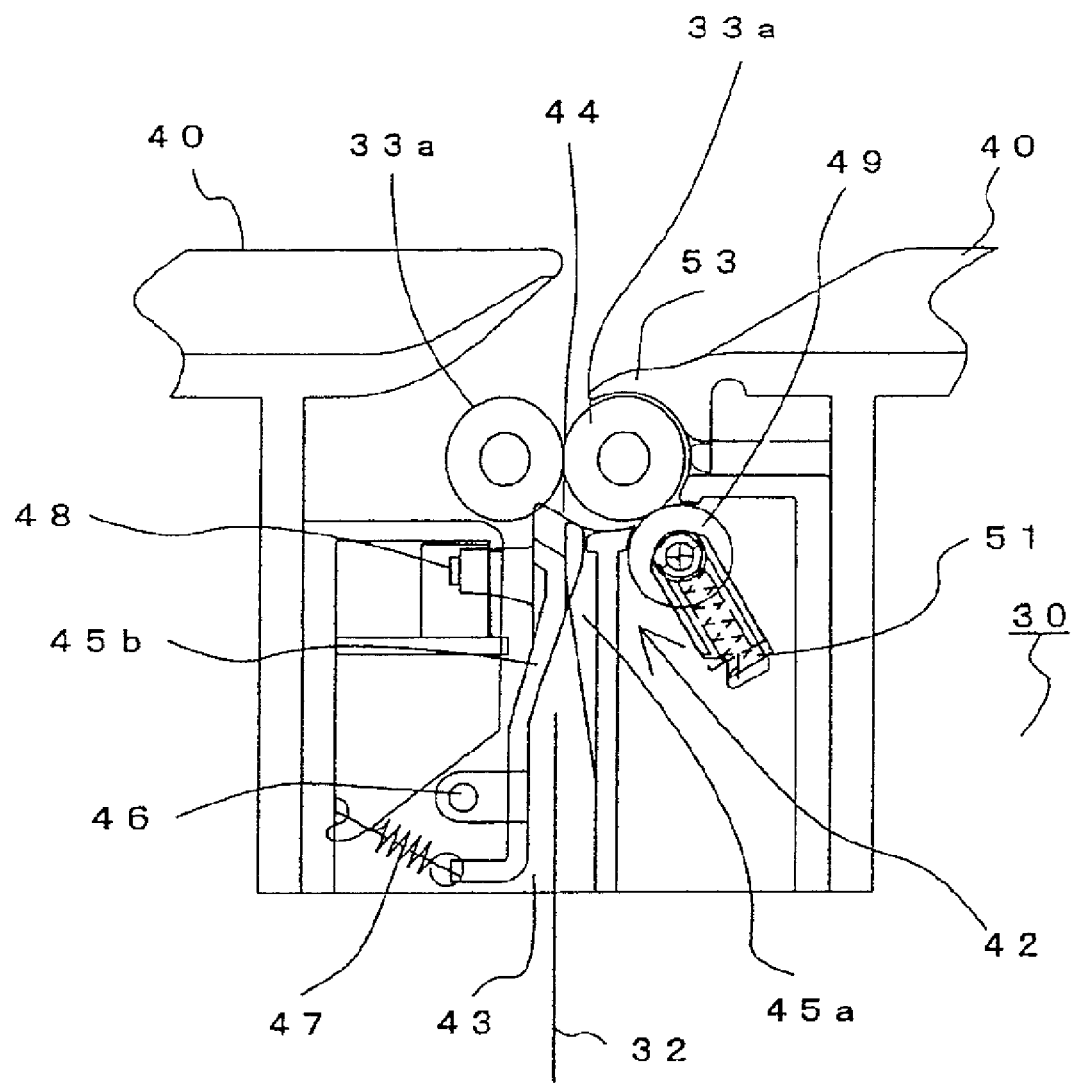
FIG. 15 is an explanation view of another example of the bending unit.
Figure 16:
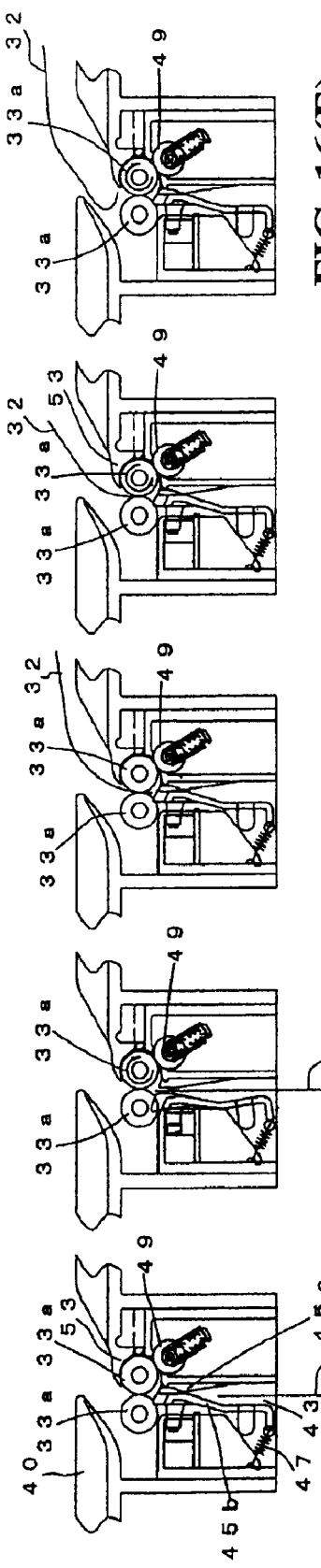
FIGS. 16A-16E are explanation views, wherein the sheet-shaped member is bent by the bending unit shown in FIG. 15.

Next, another bending unit 30 will be explained with reference to FIGS. 15 and 16.

Note that, the structural elements shown in FIGS. 12-14 are assigned the same symbols and explanation will be omitted.

In the present embodiment, a press roller 49 contacts one of the feed rollers 33a and 33a, which is located on the downstream side. The press roller 49 is pressed onto the feed roller 33a located on the downstream side by elasticity of a spring 51. A guide section 53 having an arc face is provided adjacent to the press roller 49, and the sheet-shaped member 32 can be passed through a small space between the arc face and an outer circumferential face of the feed roller 33a located on the downstream side.

The action of the bending unit 30 will be explained with reference to FIG. 16.

In FIG. 16A, the sheet-shaped member (banknote) is put in the banknote identification unit 29 and identified thereby, at that time the feed rollers 33a and 33a are not rotated.

When the identified sheet-shaped member is sent toward the feed rollers 33a and 33a by rollers (not shown), the front end of the sheet-shaped member 32 turns the movable claw piece 45b against the elasticity of the spring 47, so that the lever 45c masks (turns off) the sensor 48. When the OFF signal of the sensor is inputted to the control section, not shown, the control section drives the motor, not shown, so as to rotate the feed rollers 33a and 33a in the sheet feeding direction (see FIG. 16B).

When the sheet-shaped member 32 is fed by the feed rollers 33a and 33a and the rear end of the sheet-shaped member 32 passes the claw pieces 45a and 45b as shown in FIG. 16C, the movable claw piece 45b is returned to the initial position by the elasticity of the spring 47, so that the path 43 is closed by the claw pieces 45a and 45b, the sensor 48 is returned to a light receiving state (turned on) and the ON signal is inputted to the control section.

By inputting the ON signal to the control section, the control section stops the motor once, and then the motor is rotated a prescribed angle in the reverse direction. With this action, the sheet-shaped member 32 is moved a prescribed distance backward (see FIG. 16D).

When the sheet-shaped member 32 is moved backward, the rear end of the sheet-shaped member 32 contacts the sloped guide section 44, the rear end of the he sheet-shaped member 32 is moved backward along the sloped guide section 44, pinched between the press roller 49 and the feed roller 33a and further moved backward, so that the rear end part is fed between the rollers 33a and 33a so as to form into a tubular shape.

After the motor is rotated the prescribed angle in the reverse direction, the control section rotates the feed rollers 33a and 33a in the normal direction so as to feed the sheet-shaped member 32, in which the deformity 32b has been formed in the rear end part, into the blower duct 22 as shown in FIG. 16E.

The shape of the deformity 32b may be formed into, for example, an L-shape, a J-shape or a tubular shape by changing the distance of the backward movement of the sheet-shaped member 32.

Figure 17:
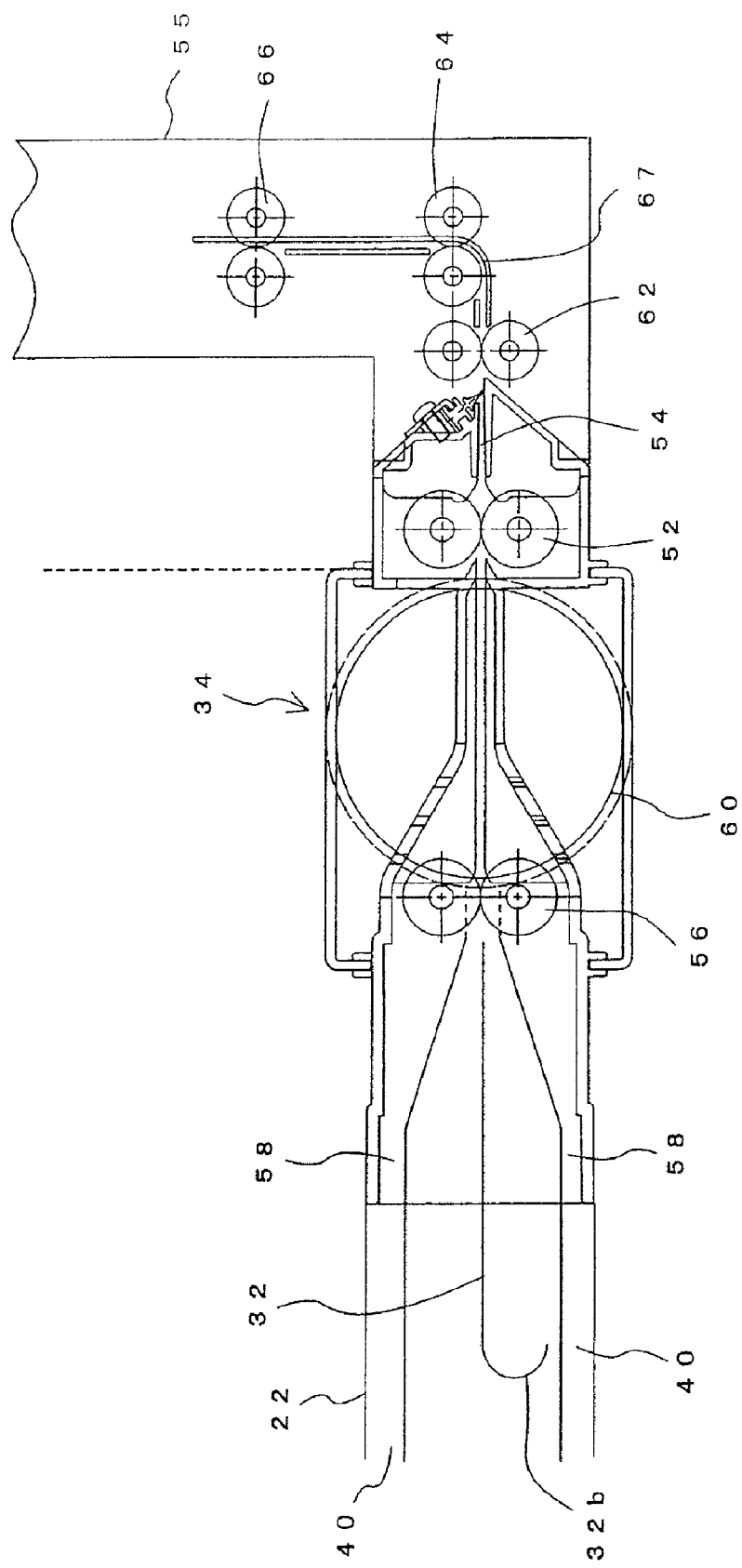
FIG. 17 is a plan view of a collecting unit.
Figure 18:
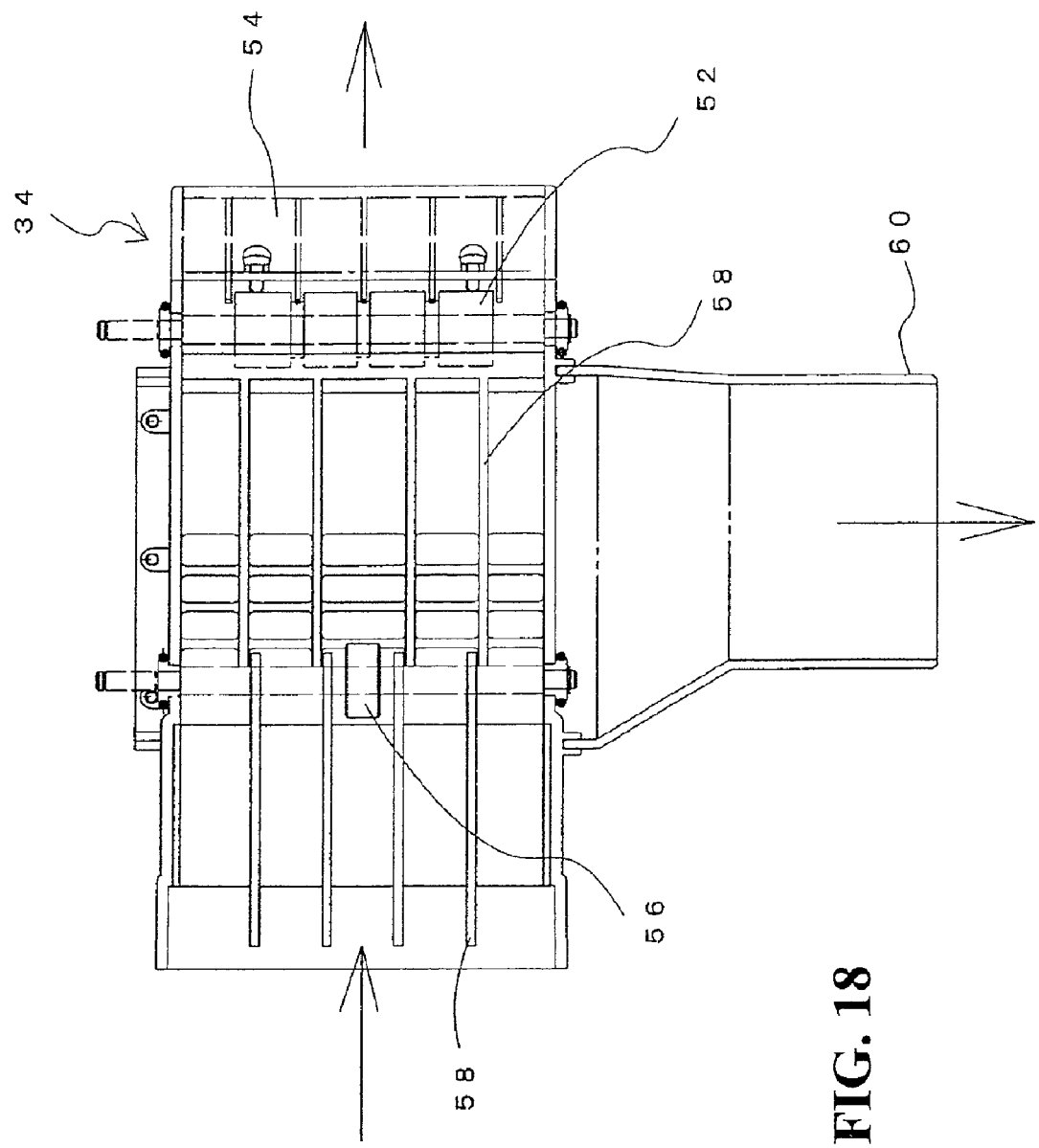
FIG. 18 is a side view of the collecting unit.

Next, details of the unit 34 for collecting the sheet-shaped members 32 will be explained with reference to FIGS. 17 and 18.

The collecting unit 34 is detachably attached to the end of the blower duct 22 and collects the sheet-shaped members (banknotes) 32 conveyed in the blower duct 22.

Conveying rollers 52 are provided at a mid part of the collecting unit 34, pinch the sheet-shaped member 32 from the both sides and sends it toward a slit 54. As shown in FIG. 18, four pairs of the conveying rollers 52 are provided so as to pinch the entire sheet-shaped member 32 in the width direction.

A pair of pinch rollers 56 are provided on the upstream side of the conveying rollers 52. The pinch rollers 56 firstly pinch the front end part of the sheet-shaped member 32 conveyed in the blower duct 22 in various postures.

Ribs 58 are connected to the ribs 40 formed in the blower duct 22, their height is gradually increased toward the pinch rollers 56, and a small gap, through which the sheet-shaped member 32 can be passed, is formed between front ends of the ribs 58 on the upstream side of the pinch rollers 56, so that the front end of the sheet-shaped member 32 can be securely introduced to the pinch rollers 56. A discharge pipe 60 is connected to the return duct 36 so as to return the air to the blower section 24. Therefore, a part of the air stream can be circulated.

A collecting box 55 is provided on the downstream side of the conveying rollers 52.

First rollers 62, which pinch the front end part of the sheet-shaped member 32, which has been conveyed through the slit 54 by conveying rollers 54, is provided in the collecting box 55 and located at an outlet of the slit 54. Second rollers 64 are provided near the first rollers 62 and arranged perpendicular to the first rollers 62. Further, third rollers 66 are provided on the downstream side. Guide plates 67 are provided along the first rollers 62, the second rollers 64 and the third rollers 66 and perpendicularly bent near the second rollers 64. The guide plates 67 are arranged parallel, so that the side edges of the sheet-shaped member 32 are guided therebetween.

The first rollers 62, the second rollers 64 and the third rollers 66 constitute restoring rollers.

The front end part of the sheet-shaped member 32, which has been conveyed through the slit 54, is pinched by the first rollers 62 and sent forward, and the both side edges of thereof are guided by the guide plates 67 so that the sheet-shaped member is pinched by the second rollers 64. The sheet-shaped member 32 is further guided by the guide plate 67, pinched by the third rollers 66 and conveyed into the collecting box 55. The guide plates 67 are perpendicularly bent in the opposite direction with respect to the deforming direction of the deformity 32b of the sheet-shaped member 32. Therefore, the deformity 32b is bent in the opposite direction when the sheet-shaped member 32 is passed through the second rollers 64, so that the deformity can be restored and the flat sheet-shaped member 32 can be collected in the collecting box 55.

The deformity 32b of the sheet-shaped member 32 has been temporarily deformed by the bending unit 30, so the deformity can be easily restored by compulsorily bending in the opposite direction by the second rollers 64.

What is claimed is:

1. An equipment for conveying sheet-shaped members, comprising:
 a plurality of blower ducts being arranged parallel;
 a common duct being connected to outlets of the blower ducts;

an air stream unit for generating air streams in the blower ducts;

a plurality of sheet feeding units being respectively connected to the blower ducts, the sheet feeding units feeding sheet-shaped members into the blower ducts;

a plurality of open and close valves being respectively provided to the blower ducts, the open and close valves opening and closing the blower ducts;

a drive section for respectively driving the open and close valves;

a collecting unit being provided to a terminal end of the common duct, the collecting unit collecting the sheet-shaped members conveyed; and a control section for controlling the drive section, wherein the control section opens the open and close valve of the blower duct, which is connected to one of the sheet feeding units into which the sheet-shaped member is inserted, and closes the open and close valves of other blower ducts so as to preferentially maintain a flow volume of the air stream in the blower duct whose open and close valve is opened and limit flow volumes of the air streams in other blower ducts when the insertion of the sheet-shaped members is detected, wherein said equipment further includes a bending unit for bending the sheet-shaped member so as to form a deformity in the sheet-shaped member, and the sheet-shaped member is conveyed by applying a wind pressure to the deformity.

2. The equipment according to claim 1, wherein the bending unit of the sheet feeding unit forms the deformity in a flat rear end part of the shear-shaped member.

3. The equipment according to claim 1, wherein the equipment is installed in a sales space, such as a supermarket and a convenience store, an amusement place, and an ATM so as to collect sale proceeds.

4. The equipment according to claim 1, wherein each of the sheet feeding units has a banknote identification unit, which is located on the front side of the bending unit, and the banknote identification unit checks if the sheet-shaped member is a banknote or not, then the sheet-shaped member is fed to the blower duct via the bending unit.

5. The equipment according to claim 4, wherein the equipment is installed in a store, such as a supermarket and a convenience store, a game hall or an ATM so as to collect sale proceeds.

6. The equipment according to claim 1, wherein the control section opens the open and close valve of one of the blower ducts and closes the open and close valves of other blower ducts so as to feed the sheet-shaped member into the blower duct, whose open and close valve has been opened, when inserting the sheet-shaped members into a plurality of the sheet feeding units is detected; and the control section closes the opened open and close valve and opens the open and close valves of other blower ducts, into which sheet-shaped members have been inserted, in order after collecting unit collects the sheet-shaped member.

7. The equipment according to claim 1, wherein a flow passage area of the common duct is substantially equal to that of the blower duct.

8. The equipment according to claim 1, wherein the air stream unit is a suction blower for sucking the air in the common duct.

9. The equipment according to claim 1, wherein the collecting unit has a restoring roller, which bend the deformity of the sheet-shaped member in the opposite direction so as to remove the deformity.

10. The equipment according to claim 1, wherein the control section opens the open and close valve of one of the blower ducts and closes the open and close valves of other blower ducts so as to feed the sheet-shaped member into the blower duct, whose open and close valve has been opened, in order of detecting the insertion of the sheet-shaped members when inserting the sheet-shaped members into a plurality of the sheet feeding units is detected; and the control section closes the opened open and close valve and opens the open and close valves of other blower ducts, into which sheet-shaped members have been inserted, in order of detecting the insertion of the sheet-shaped members after the collecting unit collects the sheet-shaped member.

11. The equipment according to claim 1, wherein the bending unit forms the deformity in a flat part of the sheet-shaped member, and the deformity is formed into an L- or a J-shape in gothic script or sanserif script or curled like a tubular shape.

12. The equipment according to claim 1, wherein a plurality of ribs, which are inwardly projected with a prescribed height and extended in the air-streaming direction, are formed in each wall face of each of the blower ducts, which face surfaces of the sheet-shaped member, and a distance between front ends of the opposite ribs is designed to allow the deformity of the sheet-shaped member to pass through a space between the ribs.

13. The equipment according to claim 12, wherein a sectional shape of a space defined by lines connecting the front ends of the ribs is a rectangular shape.

14. The equipment according to claim 12, wherein each of the blower ducts has a turning section, which turns and conveys the sheet-shaped member and is connected to the common duct by a joint duct, which has ribs connected to ribs of the blower duct and the common duct, and wherein a height of the ribs formed in an inner wall face of the turning section, which faces the one surface of the turned sheet-shaped member, is gradually reduced from a specified position, which is located on the upstream side of the turning section and separated a prescribed distance therefrom, to the turning section, and the height of the ribs is gradually increased from the turning section to a specified position, which is located on the downstream side of the turning section and separated a prescribed distance therefrom.

15. The equipment according to claim 12, wherein at least one of the blower duct and the common duct has a turning section, which turns and conveys the sheet-shaped member, and a turning duct, which has ribs connected to ribs of the blower duct and the common duct, is connected to the turning section, and wherein a height of the ribs formed in an inner wall face of the turning duct, which faces the one surface of the turned sheet-shaped member, is gradually reduced from a specified position, which is located on the upstream side of the turning section and separated a prescribed distance therefrom, to the turning section, and the height of the ribs is gradually increased from the turning section to a specified position, which is located on the downstream side of the turning section and separated a prescribed distance therefrom.

16. The equipment according to claim 12, wherein a twisted duct section, which is twisted a prescribed angle with respect to an axial line of the blower duct, is connected to at least one of the blower duct and the common duct, and the twisted tube section has ribs connected to the ribs of the blower duct and the common duct.

* * * * *